(12) United States Patent
Baker

(10) Patent No.: US 11,024,071 B2
(45) Date of Patent: Jun. 1, 2021

(54) METHOD OF CONVERTING PHONEME TRANSCRIPTION DATA INTO LIP SYNC ANIMATION DATA FOR 3D ANIMATION SOFTWARE

(71) Applicant: ESPIRITU TECHNOLOGIES LLC, Los Angeles, CA (US)

(72) Inventor: Alexander Collin Baker, Los Angeles, CA (US)

(73) Assignee: ESPIRITU TECHNOLOGIES, LLC, Los Angeles, CA (US)

( * ) Notice: Subject to any disclaimer, the term of this patent is extended or adjusted under 35 U.S.C. 154(b) by 0 days.

(21) Appl. No.: 16/732,634

(22) Filed: Jan. 2, 2020

(65) Prior Publication Data

US 2020/0211248 A1 Jul. 2, 2020

Related U.S. Application Data

(60) Provisional application No. 62/787,846, filed on Jan. 3, 2019, provisional application No. 62/788,062, filed
(Continued)

(51) Int. Cl.
*G06T 13/40* (2011.01)
*G10L 15/22* (2006.01)
(Continued)

(52) U.S. Cl.
CPC ............... *G06T 13/40* (2013.01); *G10L 15/02* (2013.01); *G10L 15/22* (2013.01); *G10L 15/26* (2013.01);
(Continued)

(58) Field of Classification Search
CPC ... G06T 13/00–80; G10L 15/02; G10L 15/22; G10L 15/26; G10L 2015/025; G10L 2021/105; G10L 21/10
See application file for complete search history.

(56) References Cited

U.S. PATENT DOCUMENTS

| 6,504,546 B1 * | 1/2003 | Cosatto | G06T 13/40 |
| | | | 345/473 |
| 9,741,337 B1 * | 8/2017 | Shastry | G10L 15/187 |
| (Continued) | | | |

OTHER PUBLICATIONS

Breton, Gaspard, Christian Bouville, and Danielle Pelé. "FaceEngine a 3D facial animation engine for real time applications." Proceedings of the sixth international conference on 3D Web technology. 2001. (Year: 2001).*

(Continued)

*Primary Examiner* — Daniel F Hajnik
(74) *Attorney, Agent, or Firm* — Risso I.P.

(57) ABSTRACT

Described is a system, method, and computer program product that substantially advances the art of animating Lip Sync in 3D computer animated characters by automatically producing data from a Phoneme Transcription of a dialog audio file, which data results in Lip Sync animation that is more realistic, smooth, and aesthetically pleasing than that produced by current Phoneme-Target Lip Sync systems. This Invention works by converting a Phoneme Transcription of a recorded dialog audio file into KeyFrame Data which dynamically controls 16 independent animation Parameters, each associated with a different part of the animated character's mouth, then algorithmically modifying that data such that it conforms to the previously unknown complex, subtle and context-specific relationships between audible phonemes and visible mouth movements.

24 Claims, 15 Drawing Sheets

Related U.S. Application Data on Jan. 3, 2019, provisional application No. 62/788,074, filed on Jan. 3, 2019, provisional application No. 62/787,757, filed on Jan. 2, 2019.

(51) Int. Cl.
*G10L 15/02* (2006.01)
*G10L 15/26* (2006.01)
*G10L 21/10* (2013.01)

(52) U.S. Cl.
CPC ........ *G10L 21/10* (2013.01); *G10L 2015/025* (2013.01); *G10L 2021/105* (2013.01)

(56) References Cited

U.S. PATENT DOCUMENTS

| | | | | |
|---|---|---|---|---|
| 2004/0095344 | A1* | 5/2004 | Dojyun | G06T 13/40 345/419 |
| 2008/0221904 | A1* | 9/2008 | Cosatto | G10L 13/00 704/276 |
| 2010/0007665 | A1* | 1/2010 | Smith | G06T 13/40 345/473 |
| 2018/0068662 | A1* | 3/2018 | Schlippe | G10L 15/26 |
| 2018/0253881 | A1* | 9/2018 | Edwards | G10L 21/10 |

OTHER PUBLICATIONS

Ma, Jiyong, and Ronald Cole. "Animating visible speech and facial expressions." The Visual Computer 20.2 (2004): 86-105. (Year: 2004).*

* cited by examiner

| Config Phoneme | Mouth Open Rule | Mouth Open Force | Mouth Open Stress Syllable | Mouth Open Min. | Mouth Corner Up-Down | Mouth Open | Mouth Wide-Narrow | Lip Bottom Cut-In | Lip Bottom Up-Down | Lip Top Cut-In |
|---|---|---|---|---|---|---|---|---|---|---|
| AA | vowel | N/A | | 60 | 20 inter | | -40 | 0 | -25 | 0 |
| AE | vowel | N/A | | 50 | 20 inter | | -30 | 0 | -10 | 0 |
| AH | vowel | N/A | | 50 | 20 | 0 | -18 | 0 | -40 | 0 |
| AO | vowel | N/A | | 50 | 20 | 0 | -45 | -35 | 50 | -14 |
| AW | vowel | XXX | | XXX | XXX | | XXX | XXX | XXX | XXX |
| AX | vowel | N/A | | 35 | 25 inter | | -18 | 0 | 0 | 0 |
| AXR | vowel | N/A | | 30 | 20 inter | | -39 | 0 | 10 | 0 |
| AY | vowel | N/A | | 50 | 20 inter | | -33 | 0 | 0 | 0 |
| B | force | | 18 | 20 | 20 inter | | | 5 | 50 | -19 |
| B.2 | force | | 15 | 19 | 15 inter | | | 7 | 55 | -23 |
| CH | force | | 12 | N/A | 10 inter | | -42 | 0 | -40 | 0 |
| D | merge | N/A | | N/A | 10 inter | | inter | inter | inter | inter |
| DH | force | | 28 | 30 | 30 inter | | inter | inter | inter | inter |
| DX | merge | N/A | | N/A | 10 inter | | inter | inter | inter | inter |
| EH | vowel | N/A | | 40 | 20 | 14 | -18 | 0 | -35 | 0 |
| EL | merge | N/A | | N/A | 20 inter | | -32 inter | inter | inter | inter |
| EL.2 | merge | N/A | | N/A | 22 inter | | -27 inter | inter | inter | inter |
| EM | force | | 21 | 20 | 21 inter | | inter | 2 | 30 | -23 |
| EN | merge | N/A | | N/A | 10 inter | | inter | inter | inter | inter |
| EN.2 | merge | N/A | | N/A | 10 inter | | inter | inter | inter | inter |
| ER | vowel | N/A | | 50 | 25 inter | | -31 | 0 | 30 | 0 |
| ER.2 | inter | N/A | | N/A | 15 inter | | -37 | -5 | 34 | -4 |
| EY | vowel | N/A | | 60 | 20 | 32 | 0 | 0 | 0 | 0 |
| F | force | 20.1 | N/A | | 19 | 27 | inter | -97 | 1 | 0 |
| F.2 | force | 19.7 | N/A | | 19 inter | | inter | -90 | -6 | 3 |
| G | inter | | N/A | | 10 inter | | inter | 0 | 0 | 0 |
| H | merge | N/A | | N/A | 20 merge | | merge | 0 | 0 | 0 |
| IH | vowel | N/A | | 35 | 15 | 21 | 7 | 0 | -30 | 0 |
| IX | vowel | N/A | | 30 | 15 | 21 | 7 | 0 | -20 | 0 |
| IY | vowel | N/A | | 30 | 20 | 39 | 39 | 0 | -58 | 0 |
| JH | force | 10.2 | N/A | | 10 inter | | -42 | 0 | -40 | 0 |
| K | merge | N/A | | | 10 merge | | merge | inter | inter | inter |
| L | merge | N/A | | | 20 inter | | merge | inter | inter | inter |

Fig. 1a

| Genres | | | | | | | | | |
|---|---|---|---|---|---|---|---|---|---|
| L2 | merge | N/A | N/A | | 20 | inter | | merge | | inter | |
| M | force | | 19.5 | 20 | 20 | inter | | inter | 2 | inter | 55 | -23 |
| M.2 | force | | 22.2 | 22 | 22 | inter | | inter | 5 | | 51 | -19 |
| N | merge | N/A | N/A | | 15 | inter | | inter | | inter | |
| N.2 | merge | N/A | N/A | | 15 | inter | | inter | 0 | inter | 20 | 0 |
| NG | inter | N/A | N/A | | 20 | inter | | | 0 | | | |
| NX | merge | N/A | N/A | | 10 | inter | | merge | | inter | | |
| OW | vowel | N/A | | 50 | 20 | | 0 | | -45 | | -35 | | 50 | -14 |
| OY | vowel | N/A | | 50 | 20 | | 0 | | -45 | | -35 | | 50 | -14 |
| P | force | | 8.5 | 10 | 10 | | 30 | merge | | 0 | | 12 | -7 |
| P.2 | force | | 9.1 | 10 | 10 | | 33 | merge | | 2 | | 8 | 0 |
| Q | inter | N/A | | | 20 | inter | | merge | | inter | | |
| R | force | | 15.3 N/A | | 15 | inter | | | -31 | 0 | 11 | 0 |
| R.2 | force | | 14.1 N/A | | 14 | inter | | | -34 | 1 | 14 | 2 |
| Rest | force | | 16 | 15 | 15 | | 0 | | 0 | 0 | 0 | 0 |
| Rest 2 | force | | 14.1 | 14 | 14 | | 2 | | 2 | 0 | 3 | 0 |
| S | force | | 9 | 10 | 5 | inter | | inter | | inter | 0 | -14 |
| S.2 | force | | 13.1 | 10 | 5 | inter | | inter | | inter | 0 | -14 |
| SH | force | | 11.5 | 10 | 10 | | 21 | | -42 | | 0 | -14 |
| SH.2 | force | | 11.3 | 10 | 10 | | 25 | | -47 | 3 | 10 | 0 |
| T | force | | 11 N/A | | 10 | inter | | inter | | inter | -55 | 2 |
| TH | force | | 28 | 28 | 28 | inter | | inter | | inter | 15 | 0 |
| TH.2 | force | | 25.1 | 25 | 25 | inter | | inter | | inter | | |
| UH | vowel | N/A | | 25 | 20 | | 0 | | -58 | -35 | 15 | -14 |
| UW | vowel | N/A | | 50 | 20 | | 0 | | -90 | -49 | 0 | -14 |
| UX | vowel | N/A | | 30 | 20 | | 0 | | -90 | -49 | 15 | -14 |
| V | force | | 29 | 29 | 28 | | 72 | | 13 | -90 | 10 | 0 |
| V.2 | force | | 27.1 | 27 | 27 | | 66 | | 7 | -83 | 8 | 2 |
| W | inter | N/A | | 35 | 20 | | 0 | | -91 | -20 | 5 | 10 |
| WH | inter | N/A | | 32 | 20 | | 0 | | -91 | -20 | 5 | 10 |
| Y | merge | N/A | | | 10 | inter | | merge | | 0 | 10 | 0 |
| Z | force | | 6 | 6 | 5 | inter | | inter | | inter | 0 | |
| Z.2 | force | | 5.5 | 5 | 5 | inter | | inter | | inter | | |
| ZH | force | | 9.5 | 9 | 10 | | 21 | | -42 | 0 | 0 | 0 |
| ZH2 | force | | 8.9 | 8 | 9 | | 24 | | -47 | 2 | 3 | 1 |

Fig. 1b

| Config Phoneme | Lip Top Up-Down | Lips Part Center | Lips Pucker Wide | Lips Pucker-Pressed | Tongue Bend Tip | Tongue Curl | Tongue In-Out | Tongue Narrow-Wide | Tongue Raise-Lower | Tongue Up-Down |
|---|---|---|---|---|---|---|---|---|---|---|
| AA | | 10 | 0 | 0 | 0 | 30 | 0 | 0 | 0 | 0 | 88 |
| AE | | 5 | 0 | 0 | 0 | 0 | -22 | 0 | 0 | 21 | 49 |
| AH | | -5 | 0 | 0 | 0 | 0 | 0 | 0 | 0 | 17 | 72 |
| AO | | -90 | 51 | 89 | 0 | 0 | 0 | 0 | 0 | -53 | 0 |
| AW | xxx | xxx | xxx | xxx | xxx | xxx | xxx | xxx | xxx | xxx |
| AX | | -3 | 0 | 0 | 0 | 25 | 0 | 0 | 0 | 0 | 80 |
| AXR | | 30 | 0 | 0 | 0 | 30 | 0 | 38 | 48 | 43 | -95 |
| AY | | 10 | 0 | 0 | 0 | 29 | 0 | 0 | 0 | 0 | 70 |
| B | | -45 | 0 | 0 | 30 | 0 | 0 | 0 | 0 | 0 | 0 |
| B.2 | -47 | | 0 | 0 | 33 | 0 | 48 | 0 | 0 | 0 | 0 |
| CH | | 30 | 0 | 0 | 55 | 0 | 0 | 0 | 0 | 80 | 0 |
| D | inter | inter | inter | 0 | 79 | 0 | -59 | -25 | 40 | 0 |
| DH | inter | inter | inter | 0 | 95 | -12 | -66 | -54 | 61 | 0 |
| DX | inter | | 0 | 0 | 79 | 0 | -59 | -25 | 30 | 0 |
| EH | | 10 | 0 | 0 | 0 | 0 | -22 | 0 | 0 | 18 | 33 |
| EL | inter | inter | inter | 0 | -96 | 0 | 0 | 79 | 0 | 0 |
| EL2 | inter | inter | inter | 0 | -90 | 0 | 0 | 70 | 0 | 0 |
| EM | -40 | | 0 | 0 | 0 | 0 | 0 | 0 | 0 | 0 | 0 |
| EN | inter | inter | inter | 0 | 0 | 0 | -40 | -61 | 67 | 0 |
| EN.2 | inter | inter | inter | 0 | 0 | 0 | -44 | -55 | 71 | 2 |
| ER | inter | 27 | 0 | 10 | 70 | 58 | 100 | -41 | 20 | -5 |
| ER.2 | inter | | 0 | 0 | 15 | 75 | 62 | 95 | -35 | 22 | -1 |
| EY | | 0 | 0 | 0 | 0 | 0 | 0 | 0 | 0 | 0 | 0 |
| F | | 15 | 0 | 0 | 35 | 0 | 0 | 0 | 0 | 0 | 0 |
| F.2 | | 20 | 1 | 1 | 0 | 0 | 0 | 0 | 0 | 0 | 0 |
| G | inter | inter | inter | 0 | 0 | 0 | 0 | 0 | 0 | 0 |
| H | inter | inter | inter | 0 | 0 | 0 | 0 | 0 | 0 | 0 |
| IH | | 30 | 0 | 0 | 0 | 0 | 0 | 0 | 0 | 0 | 0 |
| IX | | 10 | 0 | 0 | 0 | 0 | 0 | 0 | 0 | 0 | 0 |
| IY | | 0 | 0 | 0 | 0 | 0 | -48 | 0 | 0 | 80 | 0 |
| JH | | 30 | 0 | 0 | 35 | -30 | 0 | -40 | 79 | 0 | 0 |
| K | inter | inter | inter | 0 | 0 | 0 | 0 | 0 | 0 | 0 |
| L | inter | inter | inter | 0 | 0 | 0 | 0 | 0 | 0 | 0 |

Visual Depictions of Required Animation Parameters

Default Mouth

Lip Bottom Out-In NEG    Lip Bottom Out-In POS

Lip Bottom Up-Down Left NEG    Lip Bottom Up-Down Left POS    Lip Bottom Up-Down Right NEG    Lip Bottom Up-Down Right POS Lips Pucker Wide Lips Pucker-Pressed NEG Lips Pucker-Pressed POS Mouth Corner Up-Down Left NEG Mouth Corner Up-Down Left POS Mouth Corner Up-Down Right NEG Mouth Corner Up-Down Right POS Mouth Open - Close Mouth Wide-Narrow Left NEG | Mouth Wide-Narrow Left POS | Mouth Wide-Narrow Right NEG | Mouth Wide-Narrow Right POS Tongue Bend Tip NEG | Tongue Bend Tip POS Arpabet Phonemes with Emamples

| Phoneme | Example |
| --- | --- |
| AA | bot |
| AA | balm, bot |
| AE | bat |
| AE | bat |
| AH | butt |
| AH | butt |
| AO | bought |
| AW | bout |
| AX | about |
| AXR | letter |
| AY | bite |
| B | buy |
| CH | China |
| D | dog |
| DH | thy |
| DX | butter |
| EH | bet |
| EL | bottle |
| EM | rhythm |
| EN | button |
| ER | bird |
| EY | bait |
| F | fight |

Fig. 3a

| Phoneme | Example |
|---|---|
| G | guy |
| H | high |
| IH | bit |
| IX | roses, rabbit |
| IY | beat |
| JH | jive |
| K | kite |
| L | lie |
| M | my |
| N | night |
| NG | sing |
| NX | winner |
| OW | boat |
| OY | boy |
| P | pie |
| Q | Queen |
| R | rye |
| Rest | |
| S | sigh |
| SH | shy |
| T | tie |
| TH | thigh |
| UH | book |
| UW | boot |

Fig. 3b

| Phoneme | Example |
|---|---|
| UX | dude |
| V | vie |
| W | wise |
| WH | why |
| Y | yacht |
| Z | zoo |
| ZH | pleasure |

Fig. 3c

METHOD OF CONVERTING PHONEME TRANSCRIPTION DATA INTO LIP SYNC ANIMATION DATA FOR 3D ANIMATION SOFTWARE

CROSS-REFERENCE TO RELATED APPLICATIONS

The present application is a Non-Provisional Utility patent Application of U.S. Provisional Application No. 62/787,757, filed on Jan. 2, 2019, the entirety of which is incorporated herein by reference.

The present application is ALSO a Non-Provisional Utility Patent Application of U.S. Provisional Application No. 62/787,846, filed on Jan. 3, 2019, the entirety of which is incorporated herein by reference.

The present application is ALSO a Non-Provisional Utility Patent application of U.S. Provisional Application No. 62/788,074, filed on Jan. 3, 2019, the entirety of which is incorporated herein by reference.

The present application is ALSO a Non-Provisional Utility patent application of U.S. Provisional Application No. 62/788,062, filed on Jan. 3, 2019, the entirety of which is incorporated herein by reference.

BACKGROUND OF THE INVENTION

1. Field of Invention

The present invention relates to the field of 3D computer animation and, more particularly, to a system, method, and computer program product for automatically animating character mouth movements to match an audio recording of spoken dialog (i.e., Lip Sync).

2. Description of Related Art a. Introduction to Animation Lip Sync Problems

When working 3D animation software, whether creating videos or games, animators who work with speaking animated characters face the challenge of Lip-Sync. "Lip Sync" refers to the process of animating the character's mouth to match a prerecorded spoken dialog. It is appreciated that most (if not all) 3D animation software platforms allow the creation of characters that are "rigged", i.e. contain variable parameters set up to control the movement of various body parts. Entering a particular value for a parameter will cause the corresponding body part to adopt a particular pose. When placed on the timeline in an animation software, such parameter values are known as "KeyFrames". Entering a series of different KeyFrame values at different points along the animation timeline will cause the corresponding body part to move, as the software will interpolate values in between KeyFrames.

b. The Three Broad Approaches to Lip Sync Animation

Historically, three broad types of lip sync methods have emerged, referred to here as "Artist Intuition", "Facial Tracking", and "Phoneme Targeting". "Artist Intuition" refers to the talent and artistic eye of visual artists, while "Facial Tracking" refers to data-capturing the facial movements of a human actor. These two methods have their own inherent problems, and are not the subject of the present invention. The present invention solves the problems inherent to Phoneme-Target method of Lip Sync, discussed as follows.

c. Definition of "Phoneme" and "1-to-1 Phoneme Targeting" Phoneme—

A "phoneme" is an audio "building block" of human speech. All speech can be expressed as a combination of phonemes. In English, 51 phonemes have been identified. A standard phonetic alphabet called the "Arpabet" has been derived, in which a unique symbol is assigned to represent each phoneme. (see FIGS. 3a through 3c, a listing of the Arpabet Phonemes with examples in English)

1-to 1 Phoneme Targeting—

Used in both 2D and 3D animation systems, "1-to-1 Phoneme Targeting", or simply "Phoneme Targeting", refers to creating a library of reusable mouth poses, each associated with one or more phonemes, then acquiring timestamped phoneme data from the speech within the audio file, then converting the phoneme data into KeyFrame Data suitable for a chosen animation software, then placing such KeyFrame Data at the appropriate points along the animation timeline, which KeyFrame Data triggers a series of such Mouth Poses, with the animation software interpolating or morphing data in between KeyFrames, thus creating the necessary Mouth Poses for video frames in between keyFrames.

d. Problems in Phoneme Targeting Workflow

To implement a Phoneme Targeting system, the animator must somehow acquire timestamped phonemes, i.e. determining which phonemes occur, and when phonemes occur. Broadly speaking, two methods of such phoneme acquisition have emerged in the field—"manual" and "automatic"—each with significant problems.

e. Problems with Manual Phoneme Acquisition

An animator may manually enter KeyFrame Data one by one, along the timeline in the chosen animation software. The animator can hear the recorded dialog, and can also see the audio represented as a waveform. For example, if an "O" sound is being heard and seen at a certain time, the animator chooses the KeyFrame Data representing a round-mouthed "O" Mouth Pose, and places it at the appropriate point along the timeline. In the hands of a skilled animator, manual phoneme acquisition is accurate, but extremely time-consuming and cumbersome.

f. Problems with Automatic Phoneme Acquisition

Efforts to automatically acquire timestamped phonemes in one step by having software directly analyze the recorded dialog audio file have been a failure. Current technology is not capable of accurately detecting phonemes in one step directly from an audio file.

More successful phoneme acquisition is a 2-step process developed by the inventor. First, a text transcript must be generated. Presently there are various existing patented speech-to-text solutions which work reliably to analyze an audio file and deliver text. Such speech-to-text algorithms first analyze the waveform to create a list of "guesses" as to what each word might be, then apply semantic and contextual tests to determine what is the most likely combination of words being spoken.

Second, once an accurate text transcript has been obtained, the audio file plus the text may be submitted to an existing phoneme transcription service. At least one such phoneme transcription service exists in English, for the purpose of teaching English fluency.

g. The "Mechanical Mouth" Problem Inherent to 1-to-1 Phoneme Targeting and Discussion of Prior Art Targeting a mouth pose for every single phoneme detected in the audio file is herein termed "1-to-1 Targeting". Experience has shown that 1-to-1 Targeting will result in Lip Sync that appears "choppy", "robotic", or "mechanical", termed the "Mechanical Mouth" problem.

The 1-to-1 Targeting approach looks unnatural and aesthetically unpleasant because human speakers typically do not form an individual mouth pose for every single phoneme that is produced. The relationship between mouth movements and the phonemes produced is complex, subtle, and highly context-specific.

Lips, tongue and jaw coordinate independently, and often (but not always) combine multiple phonemes together into one or more syllables produced from what outwardly appears to be a single mouth movement "gesture".

Prior inventors in the field have described the problems in phoneme target Lip Sync. For example, William H. Munns in U.S. Pat. No. 7,827,034B1 "Text-derived speech animation tool" (2008), ("Munns") states that:

"A phoneme-based process is simpler in that there are less phonemes than syllables in speech, but the result is unnatural because real speech is syllabic and all dramatic quality and character of human speech derives from modulation, emphasis, and pace of the syllables, not the phonemes."

Munns (2008)

Munns categorically rejects phoneme-based lip sync—what he terms "Category B products"—because:

"phoneme system was never intended as a method of reconstructing lifelike lip animations for physical robotic and digitally embodied characters."

(Id)

It is true that the concept of "phonemes" was derived simply as a description of the fundamental "building block" elements within the sound of spoken language, with no connection to the mouth movements used to produce those sounds. Unlike the prior art, the present inventor's original research has discovered that such relationships do exist. These novel discoveries and algorithmic descriptions of the complex, subtle and context-specific relationships between phonemes and mouth movements underpin both the originality and usefulness of the present invention in the field of automatic Lip Sync for 3D animated characters.

h. Further Discussion of Prior Lip Sync Inventions

In U.S. Pat. No. 6,772,122B2, Jowitt et al. gave "Character Animation" (2000) a "method and apparatus for generating an animated character representation." ("Jowitt").

Jowitt relies on a phoneme transcription to determine mouth shapes. Jowitt is thus the embodiment of the 1-to-1 targeting approach described above. See e.g. Munns, supra. Other prior Phoneme based Lip Sync inventions have also relied on 1-to-1 targeting. See e.g. U.S. Pat. No. 7,145,606B2, Haisma et al "Post-synchronizing an information stream including lip objects replacement" (2000).

The algorithm in the present invention begins where 1-to-1 targeting inventions leave off—having a phoneme transcription. The algorithm in the present invention transforms the phoneme data in ways made possible only by the inventor's discoveries of the deep and previously unknown relationships between phonemes and mouth movements.

i. Conclusion to Background of the Invention

Thus, a continuing need exists for a method to automatically derive animation data from a Phoneme Transcription in a way that produces a realistic, smooth and natural Lip Sync animation result.

SUMMARY OF INVENTION

The present invention relates to a system, method, and computer program product for converting data contained in a Phoneme Transcription of a prerecorded audio file of human speech into data suitable for controlling 16 independent animation parameters of a 3D animated character, then modifying that data such that the resulting animation is more realistic, smooth and aesthetically pleasing than the results produced without said algorithmic modification.

In one aspect, the system includes one or more processors and a memory. The memory is a non-transitory computer-readable medium having executable instructions encoded thereon, such that upon execution of the instructions, the one or more processors perform the method/operations described herein.

In another aspect, the 16 independent animation parameters consist of Mouth Corner Up-Down, Mouth Open-Close, Mouth Wide-Narrow, Lip Bottom Out-In, Lip Bottom Up-Down, Lip Top Out-In, Lip Top Up-Down, Lips Part Center, Lips Pucker Wide, Lips Pucker Pressed, Tongue Bend Tip, Tongue Curl, Tongue In-Out, Tongue Narrow-Wide, Tongue Raise-Lower, and Tongue Up-Down.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

Figure 1D:
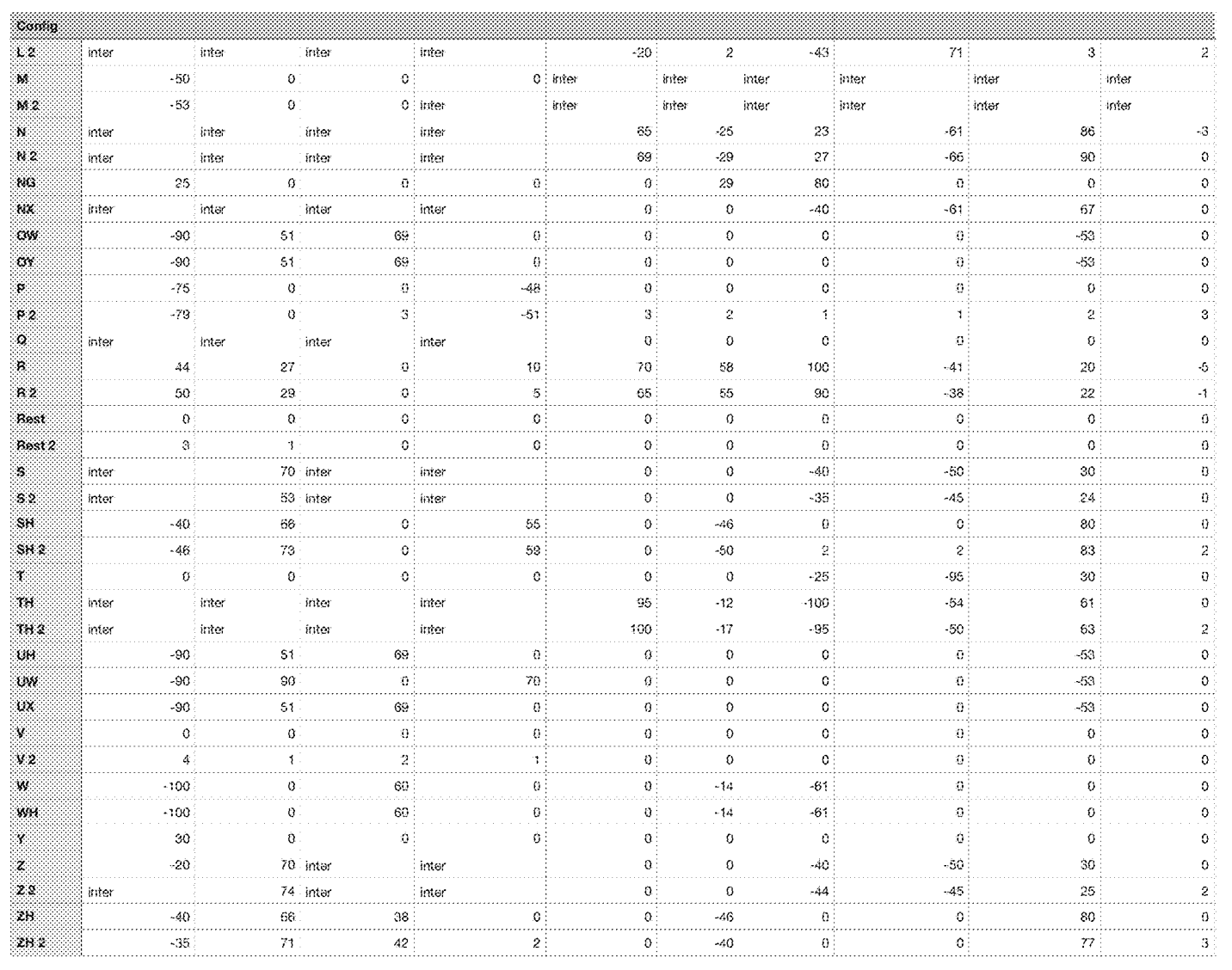

FIGS. 1a through 1d provide a depiction of the Configuration File, i.e. a table showing the Configuration Data. For each of the Arpabet Phonemes, a numeric value or a string value is given for each animation parameter. This Configuration Data determines the initial transformation from a Phoneme Transcription into Animation Data, which comprises the "starting point" for the algorithm to begin its work.

FIGS. 3a through 3c provide a table listing the standard Arpabet Phonemes, with an English language example of each.

DETAILED DESCRIPTION

The present invention relates to the field of 3D computer animation, and more particularly to the area of automatically animating character mouth movements to match an audio recording of spoken dialog, i.e. Lip Sync.

The following description is presented to enable one of ordinary skill in the art to make and use the invention and to incorporate it in the context of particular applications. Various modifications, as well as a variety of uses in different applications will be readily apparent to those skilled in the art of 3D animation, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details of the algorithm are set forth in algebraic terms in order to provide a more thorough understanding of the present invention. However, it will be apparent to one skilled in the art that the present invention may be practiced without necessarily being limited to these specific details. In other instances, well-known structures and devices are indicated by terminology in common use, in order to avoid obscuring the present invention.

The reader's attention is directed to all papers and documents which are filed concurrently with this specification. The contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use, explicitly or implied, of "step of" or "act of" in the claims herein is not intended to invoke the provisions of 35 U.S.C. 112, Paragraph 6.

As noted above, the present disclosure is directed to a system, method, and computer program product for converting Phoneme Transcription data Into Lip Sync animation data for 3D animation software.

Required Animation Parameters

Automatically producing realistic, smooth and aesthetically pleasing Lip Sync animation in a 3D modeled character utilizing the present invention in an animation platform requires an animated character with the following character rig parameters:

a. Default Mouth

Figure 2A:
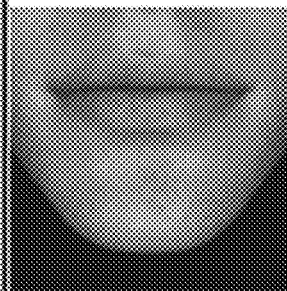
FIGS. 2a through 2q are a series of images of the mouth of a 3D model in various poses, marked as 2a-2q, and demonstrating the animation parameters that are required in an animation platform for the successful implementation of the present invention. See Section E, items 2a-2q below, describing the required animation parameters, and referencing FIG. 2a-2q.

The mouth is in a neutral pose, with jaw closes, lips together, and neither a smile nor a frown. This corresponds to all animation parameters at value 0, and see FIG. 2a.

b. Lip Bottom Out-In

Figure 2B:
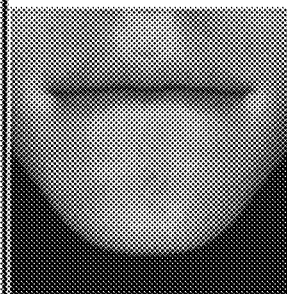
Figure 2B:
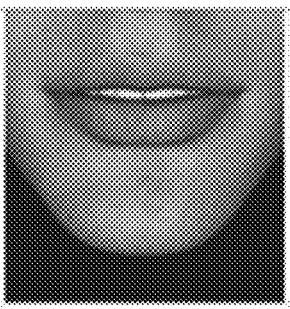

The lower lip curls inwards or outwards. Values range from −100 (max. inwards) to 100 (max. outwards), and see FIG. 2b.

c. Lip Bottom Up-Down

Figure 2C:
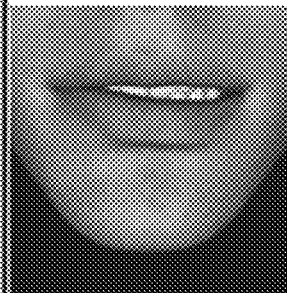
Figure 2C:
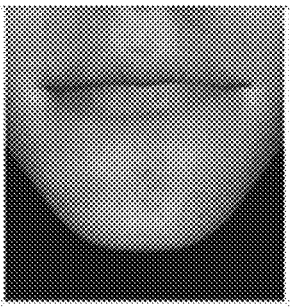
Figure 2C:
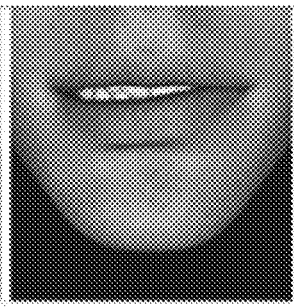
Figure 2C:
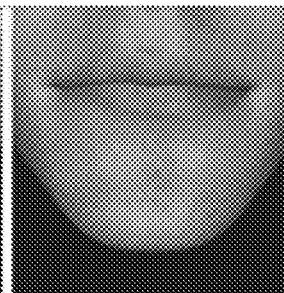

The lower lip stretches to move upward or downwards, independently from the lower teeth and jaw. Values range from −100 (max. upwards) to 100 (max. downwards), and see FIG. 2c.

d. Lip Top Out-In

Figure 2D:

The upper lip curls inwards or outwards. Values range from −100 (max. inwards) to 100 (max. outwards), and see FIG. 2d.

e. Lip Top Up-Down

Figure 2E:
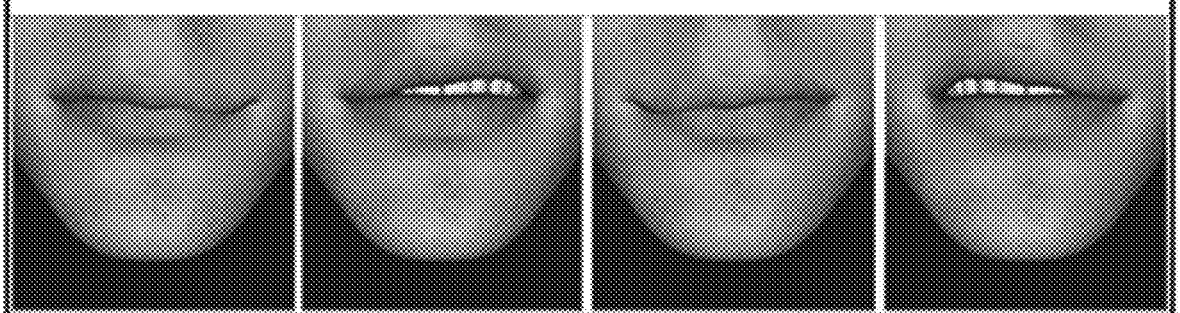

The upper lip stretches to move upward or downwards, independently from the upper teeth and jaw. Values range from −100 (max. inwards) to 100 (max. outwards), and see FIG. 2e.

f. Lips Part Center

Figure 2F:
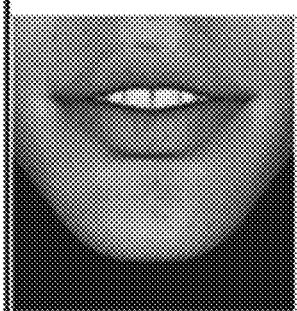

The lips part in the middle, while remaining relatively static towards the corners of the mouth. Values range from 0 (default)–100 (max), and see FIG. 2f.

g. Lips Pucker Wide

Figure 2G:
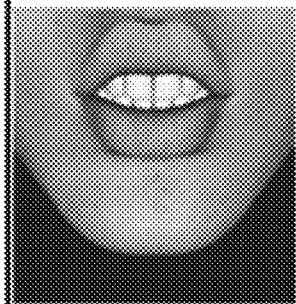

The lips are curled outwards while parting. Values range from 0 (default)–100 (max), and see FIG. 2g.

h. Lips Pucker Pressed

Figure 2H:

The lips are curled inwards or outwards while remaining together. Values range from −100 (max. inwards) to 100 (max. outwards), and see FIG. 2h.

i. Mouth Corner Up-Down

Figure 2I:
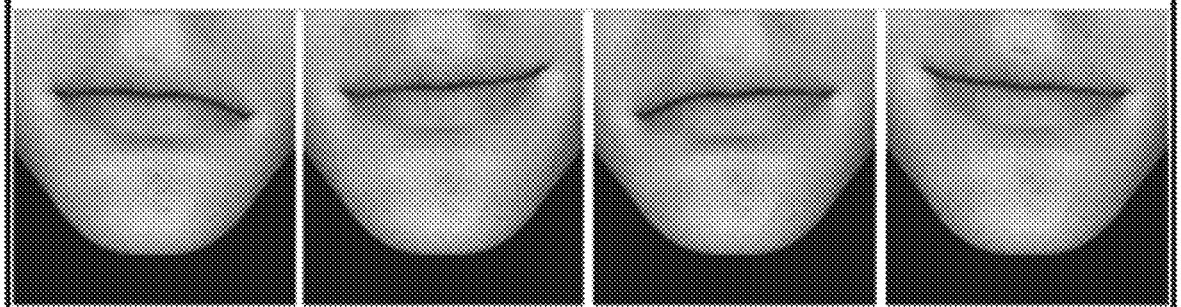

The skin around the corners of the mouth moves up, as with smiling, or down, as with frowning. Values range from −100 (max. upwards) to 100 (max. downwards), and see Fig. and see FIG. 2i.

j. Mouth Open-Close

Figure 2J:
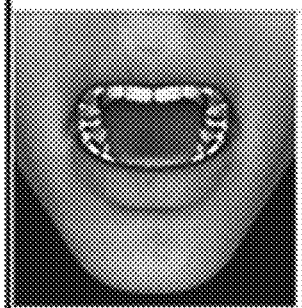

The lower jaw pivots on a hinge, along with the lower teeth, which are rigidly attached to the lower jaw. The tongue and lower lip also move along with the lower jaw, but less rigidly so. Values range from 0 (default, mouth closed) to 100 (max. mouth open), and see FIG. 2j.

k. Mouth Wide-Narrow

Figure 2K:
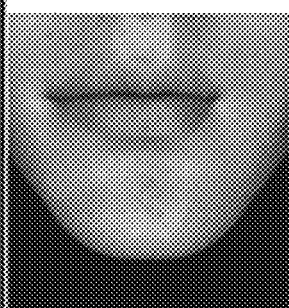
Figure 2K:
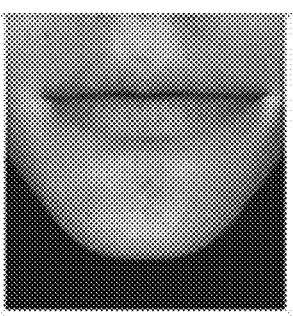
Figure 2K:
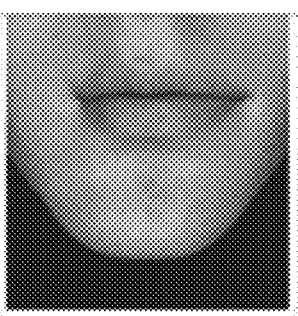
Figure 2K:
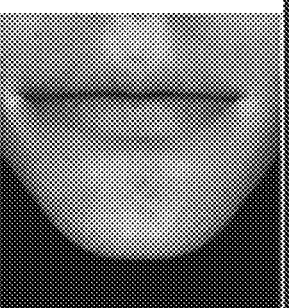

The skin around the corners of the mouth stretches horizontally inwards, or outwards. Values range from −100 (max. inwards) to 100 (max. outwards), and see FIG. 2k.

l. Tongue Bend Tip

Figure 2L:
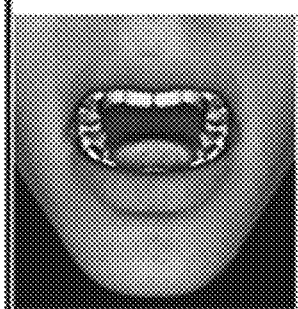
Figure 2L:
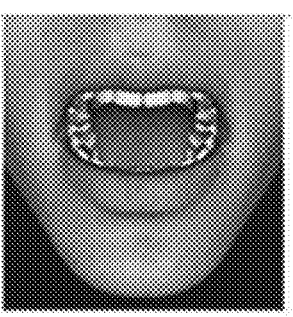

The top of the tongue bends upwards or downwards. Values range from −100 (max. upwards) to 100 (max. downwards), and see FIG. 2l.

m. Tongue Curl

Figure 2M:
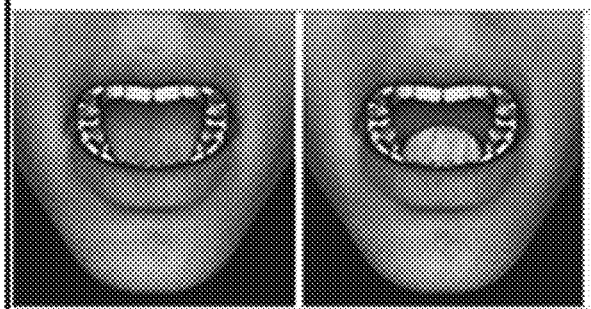

The tongue bends up or down along the entire length of the tongue. Values range from −100 (max. downwards) to 100 (max. upwards), and see FIG. 2m.

n. Tongue In-Out

Figure 2N:
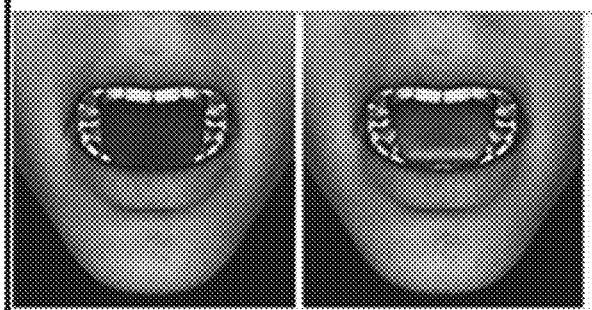

The tongue moves forwards towards and beyond the front teeth, or backwards away from the front teeth. Values range from −100 (max. forward) to 100 (max. backward), and see FIG. 2n.

o. Tongue Narrow-Wide

Figure 2O:
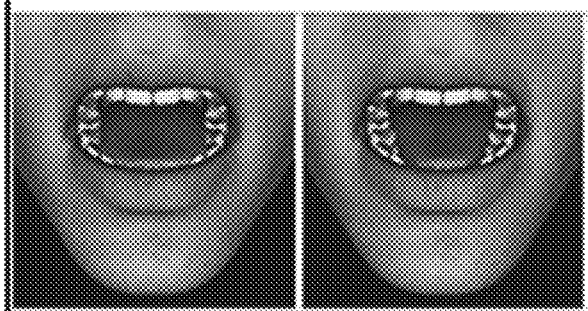

The tongue flexes to becomes narrower yet thicker, or relaxes to become wider yet thinner. Values range from −100 (max. wider) to 100 (max. narrower), and see FIG. 2o.

p. Tongue Raise-Lower

Figure 2P:
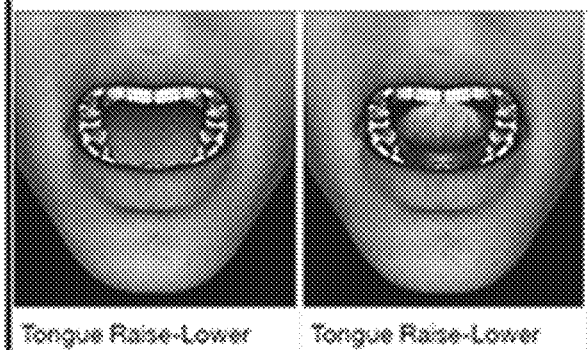

The entire tongue bends up or down. Values range from −100 (max. downwards) to 100 (max. upwards), and see FIG. 2p.

q. Tongue Up-Down

Figure 2Q:
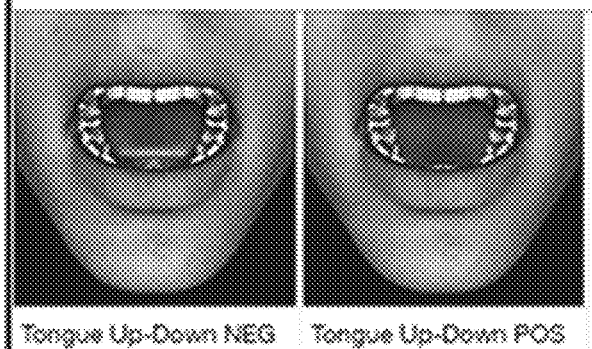

The entire tongue lifts up or down. Values range from −100 (max. up) to 100 (max. down), and see FIG. 2q.

Input to the Invention

Input to the invention is an audio file containing human speech, and a phoneme transcription of the audio file, timestamped in milliseconds, and containing syllable-level segmentation, word-level segmentation, and data about the stress level of each phoneme (i.e. stressed or non-stressed). Such phoneme transcription may be obtained by first sending the audio file to an "off-the-shelf" speech-to-text service, then sending the same audio file with text to an "off-the-shelf" Arpabet phoneme analysis service.

Algorithm for Converting Phoneme Transcription to Key-Frame Data

1. Each Arpabet Phoneme is assigned a Frame Number according to the following. The user selects an animation Frame Rate (number of animation frames per second) matching the Frame Rate of the target animation project. The StartTime of each Phoneme is converted to a FrameNumber by (StartTime/(1/Frame Rate))+1, rounded down to nearest integer.
2. FrameNumbers will be calculated as a function of the Frame Rate, referred to here as "FR Factor". FR Factor=Frame Rate/30, rounded up to nearest integer, minimum value of FR Factor=1.
3. Each Phoneme is associated with KeyFrame Data according to the Configuration Map (see FIGS. 1a through 1d). For each phoneme, the KeyFrame Data initially consist of a numeric value or a string value for each of the animation parameters listed in the section above "Summary of Required Animation Parameters". Thus, some of the Parameters will have numeric values. Other parameters are assigned one of the following string values: "merge" or "inter". Parameters initially assigned as "merge" or "inter" will subsequently have their values calculated according to the Algorithm.
4. Each Phoneme is associated with a Mouth Open Rule. The Mouth Open rule for each phoneme consists of one of the following string values: "merge", "inter", "force", or "vowel". (see FIGS. 1a through 1d). A numeric value for the Mouth Open parameter will be calculated according to the Algorithm.
5. Each Phoneme is associated with a Mouth Open Minimum value (see FIGS. 1a through 1d).
6. Each Phoneme is associated and a Mouth Open Force value. (see FIGS. 1a through 1d). If and when these values are used is context-specific and controlled by the Algorithm.
7. Each Phoneme is also associated with the following additional data obtained in the Phoneme Transcription, and collectively referred to as "Word-And-Syllable Data":
   Is phoneme the first phoneme in a word? TRUE/FALSE
   Is phoneme the last phoneme in a word? TRUE/FALSE
   Is phoneme the first phoneme in a syllable? TRUE/FALSE
   Is phoneme the last phoneme in a syllable? TRUE/FALSE
   What is the stress level of the syllable? 1/0
8. If there are any two phonemes on the same frame number, this is a "Zero Duration Event". Increase the Zero Duration Events to a duration of 1 frame by the following method. First preference is to move the phoneme earlier by FR Factor frame(s). If there is already a phoneme there, then second choice is to move the next phoneme later by FR Factor frame(s). If that is not available, then delete the Phoneme.
9. For any phoneme that ends before the next phoneme begins, this is silence, and label that a "rest" phoneme.
10. For any phoneme that="rest" and duration <5*FR Factor frames, delete phoneme.
11. For any phoneme that="AW", change to phoneme="AA" and add phoneme "UH" halfway to next phoneme.
12. For any phoneme that is after Rest, move next Phoneme earlier by ½ the distance, or by 5*FR Factor frames, whichever is less.
13. For any phoneme, if duration=FR Factor, and duration of phoneme (x−1)>4*FR Factor, then move phoneme earlier by 2*FR Factor frames.
14. For any phoneme, if duration=2*FR Factor, and duration of phoneme (x−1)>3*FR Factor, then move phoneme earlier by 1*FR Factor frame(s).
15. Add a "Rest" phoneme 10*FR Factor frames after the end of last phoneme.
16. For all Phonemes if Phoneme(x)="F" or "EL" or "EN" or "ER" or "L" or "M" or "N" or "S" or "SH" or "TH" or "V" or "Z" or "ZH" or "P" or "B" then create a new Keyframe ½ the distance to the next Phoneme, and fill in the values from the Configuration File, using second-listed version of the Phoneme from the Configuration File.
17. Fill in all values from Configuration File.
18. For each phoneme, if Mouth Open Rule="vowel" and phoneme is first vowel in syllable, then mark "First Vowel in Syllable"=TRUE
19. For any phoneme if Mouth Open Rule="force" then Mouth Open=Mouth Open Force value.
20. For any phoneme if Mouth Open Rule="vowel" then if Syllable Stress Level >0 then Mouth Open=Mouth Open Stress Syllable value.
21. For any phoneme if Phoneme="R" and Duration of Phoneme (x−1)<5*FR Factor then Mouth Open value of Phoneme (x)="inter".
22. For any phoneme if Phoneme (x)="W" or "WH" and firstPhoneinSyllable "TRUE" then Mouth Open value of Phoneme (x)="inter".
23. For any phoneme, if Phoneme(x)="Rest" and duration >6*FR Factor then create new keyframe "Rest 2" 3*FR Factor frames before next phoneme.
24. For any phoneme if duration of Phoneme(x)=1*FR Factor and duration of Phoneme (x−1)>2*FR Factor, then, then move Phoneme(x) earlier by 1*FR Factor frame(s).
25. For any phoneme if duration of Phoneme(x)=1*FR Factor and duration of Phoneme (x+1)>2*FR Factor, then, then move Phoneme(x+1) later by 1*FR Factor frame(s).
26. For any phoneme if Mouth Open Rule="merge" and SyllableStressLevel value <1 then if First Phone in Syllable "TRUE" then change Mouth Open value to "inter".
27. For any phoneme if Mouth Open Rule="merge" then if First Phone in Syllable "TRUE" then change Mouth Open value to "inter".
28. For any phoneme if Mouth Open Rule="vowel" and SyllableStressLevel value <1 then Mouth Wide-Narrow="inter" and Mouth Corner Up-Down="inter" and Mouth Open="inter".

29. For any phoneme if Mouth Wide-Narrow value="merge" then if First Phone in Syllable="TRUE" then copy Mouth Wide-Narrow value from next non-same phoneme and paste to Mouth Wide-Narrow value, and change Mouth Wide-Narrow value of next non-same phoneme to "inter".
30. For any phoneme if Mouth Corner Up-Down value="merge" then if First Phone in Syllable="TRUE" then copy Mouth Corner Up-Down value from next non-same phoneme and paste to Mouth Corner Up-Down value, and change Mouth Corner Up-Down value of next non-same phoneme to "inter".
31. For any phoneme if Mouth Wide-Narrow value="merge" then if First Phone in Syllable "TRUE" then change Mouth Wide-Narrow value to "inter".
32. For any phoneme if Mouth Corner Up-Down value="merge" then if First Phone in Syllable "TRUE" then change Mouth Corner Up-Down value to "inter".
33. For all values in Mouth Open column if Mouth Open(x)=Mouth Open (x+1) then check if Mouth Open (x)=Mouth Open(x+2), and so on . . . counting, and let n=the total number of times that the same Mouth Open value appears in sequence. m=n/2, rounded down to integer if necessary. Mouth Open (x+m) is "target value", and will not change. For each Mouth Open (x) to Mouth Open (x+m−1), Mouth Open="inter". For each Mouth Open (x+m+1) to Mouth Open (x+n−1), Mouth Open="inter".
34. For all values in Lip Bottom Up-Down column if Lip Bottom Up-Down (x)=v (x+1) then check if Lip Bottom Up-Down (x)=Lip Bottom Up-Down (x+2), and so on . . . counting, and let n=the total number of times that the same Lip Bottom Up-Down value appears in sequence. m=n/2, rounded down to integer if necessary. Lip Bottom Up-Down (x+m) is "target value", and will not change. For each Lip Bottom Up-Down (x) to Lip Bottom Up-Down (x+m−1), Lip Bottom Up-Down="inter". For each Lip Bottom Up-Down (x+m+1) to Lip Bottom Up-Down (x+n−1), Lip Bottom Up-Down="inter".
35. For all values in Lip Top Up-Down column if Lip Top Up-Down (x)=v (x+1) then check if Lip Top Up-Down (x)=Lip Top Up-Down (x+2), and so on . . . counting, and let n=the total number of times that the same Lip Top Up-Down value appears in sequence. m=n/2, rounded down to integer if necessary. Lip Top Up-Down (x+m) is "target value", and will not change. For each Lip Top Up-Down (x) to Lip Top Up-Down (x+m−1), Lip Top Up-Down="inter". For each Lip Top Up-Down (x+m+1) Lip Top Up-Down (x+n−1), Lip Top Up-Down="inter".
36. For any phoneme if Phoneme(x)="AXR" or "CH" or "D" or "DH" or "DX" or "EN" or "ER" or "L" or "JH" or "N" or "NX" or "R" or "S" or "SH" or "T" or "Z" or "ZH" and firstPhoneinSyllable="TRUE" and duration of Phoneme(x−1)>5*FR Factor then insert Phoneme "null" 3*FR Factor frames before Phoneme(x), setting "Tongue Raise-Lower"=0, "Tongue Curl"=0, and "Tongue Up-Down"=0, leave all other column values blank.
37. For all remaining phoneme parameters if value="inter" or parameter has no value, set a value with linear interpolation, to 2 decimal place accuracy. If no interpolation is possible, use min. value for Mouth Open parameter, and use "0" for any other parameter.
38. For any phoneme if Phoneme="T", "DX" or "D", and First Phone in Syllable="TRUE" then Add "Mouth Open" value to "Tongue Raise-Lower" value.
39. For any phoneme if Phoneme="T" and syallableStressLevel=0 then delete phoneme.
40. For any phoneme if Phoneme="T" or "D" or "N" and lastPhoneinSyllable="TRUE" and firstPhoneinSyllable "TRUE" then delete phoneme.
41. For all phonemes if Mouth Open value <Mouth Open Min. value then Mouth Open=Mouth Open Min. value.
42. For all phonemes if Phoneme(x)=Phoneme(x+1) then delete Phoneme(x+1) and move Phoneme(x) later so that it is half the distance to where Phoneme(x+1) was, rounding later if necessary.
43. For all phonemes if Phoneme(x) Mouth Open Rule="vowel" and Phoneme(x+1) Mouth Open Rule="vowel" and duration of Phoneme(x)<3 then delete Phoneme(x).
44. For any Phoneme if duration of Phoneme(x)<5*FR Factor then for every non-tongue parameter if ((ABS (Parameter(x+1)—Parameter(x)))/Duration)>20/FR Factor then Parameter (x+1)=Parameter (x)+(20*Duration)
45. For any Phoneme if Phoneme(x)="F" or "F 2" or "V" or "V2" then restore values from Configuration File for Lip Bottom Up-Down, Lip Top Up-Down, Lip Top Out-In, Lip Bottom Out-In, Lips Pucker-Pressed, Lips Pucker Wide, and Lips Part Center.
46. For any Phoneme if duration of Phoneme(x)<3*FR Factor or duration of Phoneme(x+1) is <3*FR Factor and Phoneme (x+1)="R" and Phoneme(x+1) firstPhoneinSyllable "TRUE" and Phoneme(x) "B" or "F" or "G" or "K" or "P" or "SH" or "T" or "TH", then delete Phoneme (x+1).
47. For any Phoneme if duration of Phoneme(x)<3*FR Factor or duration of Phoneme(x+1) is <3*FR Factor and Phoneme (x+1)="Y" and Phoneme(x+1) firstPhoneinSyllable "TRUE" then delete Phoneme (x+1).
48. For every Phoneme if Phoneme(x)="M" or "M 2" then Lip Bottom Up-Down(x)=Mouth Open(x)*2 and Lip Top Up-Down(x)=Mouth Open(x)*−2 and Lips Part Center(x)=0
49. For every Phoneme if Phoneme(x)="P" or "P 2" then Lip Bottom Up-Down(x)=(Mouth Open(x)*2)−30 and Lip Top Up-Down(x)=(Mouth Open(x)*−2)−30 and Lips Part Center(x)=0
50. For every Phoneme if Phoneme(x)="B" or "B 2" then Lip Bottom Up-Down(x)=(Mouth Open(x)*2)+30 and Lip Top Up-Down(x)=(Mouth Open(x)*−2)+30 and Lips Part Center(x)=0
51. If Phoneme (x)="R 2" or "ER 2" and duration <FR Factor*3, then delete Phoneme(x).
52. For every Phoneme if Phoneme(x)="L" or "L 2" or "EL" or "EL 2" then Tongue Raise-Lower(x)=Mouth Open(x).
53. For every Phoneme if Tongue In-Out(x) is <0 and Tongue Raise-Lower(x)<30 then Tongue In-Out(x)=0.
54. For every Phoneme if Tongue In-Out(x)<0 and Mouth Open(x)<27 then Tongue In-Out=0.
55. For every Phoneme if Phoneme(x)="D" or "DH" or "DX" or "EM" or "EN" or "F" or "G" or "M" or "S" or "T" or "TH" or "Z" then Mouth Wide-Narrow(x) =Mouth Wide-Narrow(x)−(Lips Pucker-Pressed(x−1) *0.5)−(Lips Pucker Wide(x−1)*0.5)
56. For every Phoneme if Phoneme(x)="EN 2" or "F 2" or "M 2" or "S 2" or "TH 2" or Z 2" then Mouth Wide-Narrow(x)=Mouth Wide-Narrow(x)−(Lips Pucker-Pressed(x−2)*0.5)−(Lips Pucker Wide(x−2)*0.5)

57. For every Phoneme for every parameter if Parameter (x)>100 then Parameter (x)=100.
58. For every Phoneme for every parameter if Parameter (x)<−100 then Parameter(x)=−100
59. For any phoneme that="rest" and duration<5*FR Factor frames, delete phoneme, unless it is the very last phoneme in the file (the one added in step 7.0). Don't delete that one.
60. Delete columns "KeyFrame", "Word", "FirstPhoneinWord", "lastPhoneinWord", "syllable", "syllableStressLevel", "firstPhoneinSyllable", "lastPhoneinSyllable", first VowelinSyllable", "Mouth Open Rule", "Mouth Open Force", "Mouth Open Stress Syllable", and "Mouth Open Min.".
61. For every column that is a "parent" column, copy and paste data into each of the two "child" columns. Then delete parent column.
62. Add new column "Frame Rate". Insert Frame Rate value into every cell.
63. Round all values to integers.

Output from the Invention

In one aspect, the present invention will output a data file in the form of a spreadsheet with a column containing the frame numbers, a column for each of the 16 animation parameters, plus another column indicating the frame rate. Each of an arbitrary number of rows of the spreadsheet represents the animation data required for 1 particular Keyframe.

It is appreciated that one skilled in the art of 3D animation will understand how to apply the data contained in the output file described to the appropriate controls in the rigged character within the chosen 3D animation platform. Thus, in another aspect, the invention includes any suitable 3D animation platform and using the process described herein along with the 3D animation platform to render a 3D animation based on the aforementioned spreadsheet.

Various embodiments of the invention include three "principal" aspects. The first is a system for converting phoneme transcription data into lip sync animation data for 3d animation software. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 4:
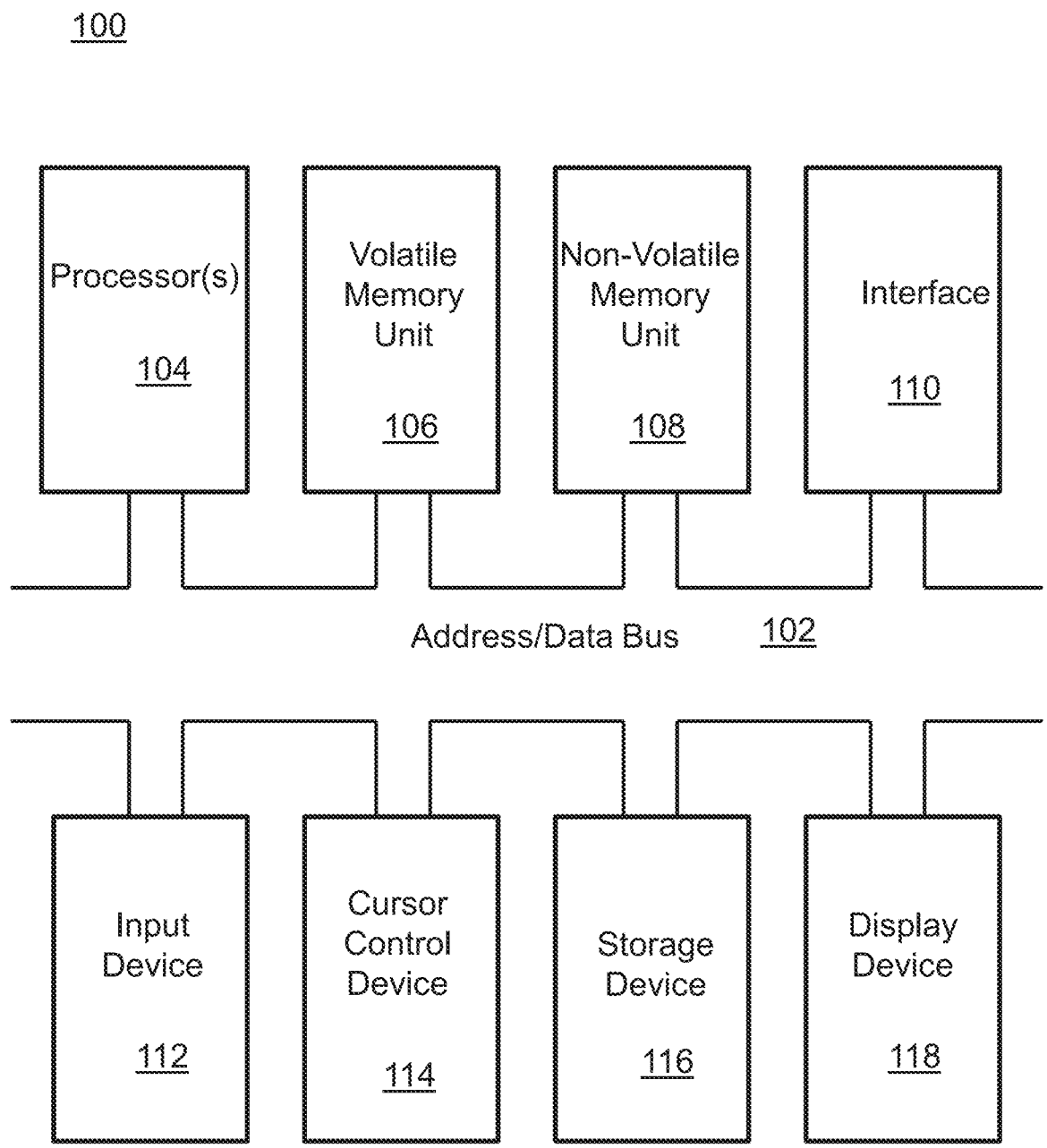
FIG. 4 is a block diagram depicting the components of a system according to various embodiments of the present invention.

A block diagram depicting an example of a system (i.e., computer system 100) of the present invention is provided in FIG. 4. The computer system 100 is configured to perform calculations, processes, operations, and/or functions associated with a program or algorithm as described above and herein. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 5:
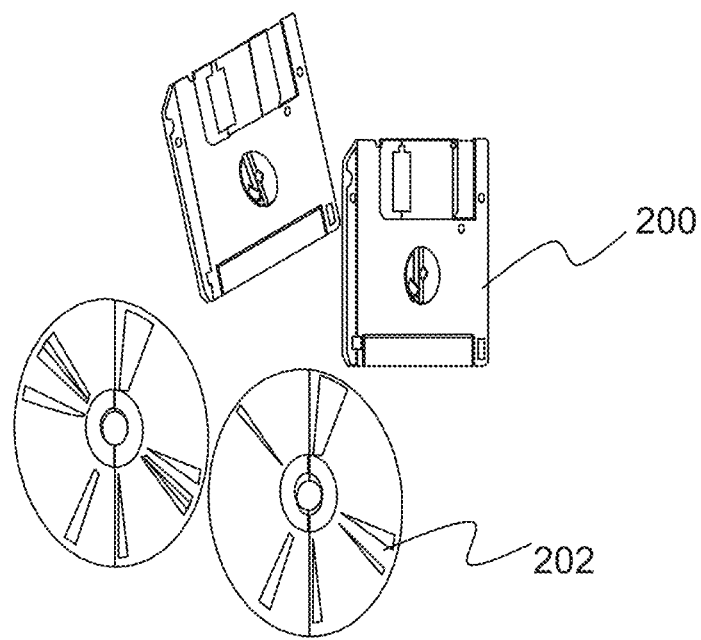
FIG. 5 is an illustration of a computer program product embodying an aspect of the present invention.

An illustrative diagram of a computer program product (i.e., storage device) embodying the present invention is depicted in FIG. 5. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

CONCLUSION TO DETAILED DESCRIPTION

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for converting phoneme transcription data into lip sync animation data for three-dimensional (3D) animation software, comprising:
one or more processors and a memory, the memory being a non-transitory computer-readable medium having executable instructions encoded thereon, such that upon execution of the instructions, the one or more processors perform operations of:
modifying data contained in a phoneme transcription of a pre-recorded audio file of human speech into animation keyframe data suitable for controlling a plurality of independent animation parameters of a 3D animated character, wherein the phoneme Transcription includes phonemes and the data is modified into the keyframe data by:
associating each phoneme with a Mouth Open Rule;
associating each phoneme with a Mouth Open Minimum value;
associating each phoneme with a Mouth Open Force value;
associating each phoneme with Word-And-Syllable Data; and
generating keyframe data for controlling the plurality of independent animation parameters based on the Mouth Open Rule, the Mouth Open Minimum value, the Mouth Open Force value, and the Word-And-Syllable Data.

2. The system as set forth in claim 1, wherein the plurality of independent animation parameters consist of Mouth Corner Up-Down, Mouth Open-Close, Mouth Wide-Narrow, Lip Bottom Out-In, Lip Bottom Up-Down, Lip Top Out-In, Lip Top Up-Down, Lips Part Center, Lips Pucker Wide, Lips Pucker Pressed, Tongue Bend Tip, Tongue Curl, Tongue In-Out, Tongue Narrow-Wide, Tongue Raise-Lower, and Tongue Up-Down.

3. The system as set forth in claim 1, wherein the data is modified such that it conforms with relationships between phonemes and mouth movements.

4. The system as set forth in claim 3, wherein the data is modified by performing an operation of:
changing any AW phoneme to an AA phoneme and adding a UH phoneme halfway to a next phoneme following said AA phoneme.

5. The system as set forth in claim 3, wherein the data is modified by performing operations of:
labeling any phoneme that ends before a next phoneme begins as a Rest phoneme; and
for any phoneme that is after a Rest phoneme, moving said phoneme earlier by lesser of one half a distance between said phoneme and said Rest phoneme and five times a frame rate factor (FR Factor).

6. The system as set forth in claim 3, wherein the data is modified by performing operations of:
for any phoneme, if a duration of said phoneme is equal to the FR Factor and a duration of the phoneme (x−1) is greater than four times the FR Factor, then moving the phoneme earlier by two times the FR Factor frames;

for any phoneme, if duration of the phoneme is equal to two times the FR Factor, and the duration of the phoneme (x−1) is greater than three times the FR Factor, then moving the phoneme earlier by one times the FR Factor frames.

7. The system as set forth in claim 3, wherein the data is modified by performing operations of:
for all phonemes, if phoneme(x) is equal to "F" or "EL" or "EN" or "ER" or "L" or "M" or "N" or "S" or "SH" or "TH" or "V" or "Z" or "ZH" or "P" or "B", then creating a new Keyframe one half a distance to a next phoneme and filling in values for the associated phoneme from a configuration file.

8. The system as set forth in claim 3, wherein the data is modified by performing one or more operations of:
for each phoneme, if a Mouth Open Rule is equal to "vowel" and the phoneme is a first vowel in a syllable, then marking "First Vowel in Syllable" equals TRUE;
for any phoneme, if a Mouth Open Rule is equal to "force", then designating a Mouth Open value equal to a Mouth Open Force value;
for any phoneme, if a Mouth Open Rule equals "vowel", and if Syllable Stress Level >0, then designating a Mouth Open value equal to a Mouth Open Stress Syllable value;
for any phoneme, if the phoneme is "R" and a duration of the phoneme (x−1)<5 times FR Factor, then designating the Mouth Open value of phoneme (x) equal to "inter";
for any phoneme, if phoneme (x) is equal to "W" or "WH" and a firstPhoneinSyllable is not equal to "TRUE", then designating a Mouth Open value of phoneme (x) qual to "inter";
for any phoneme, if phoneme(x) is equal to "Rest" and a duration of the phoneme is greater than six times the FR Factor, then creating keyframe "Rest 2" three times the FR Factor frames before a next phoneme;
for any phoneme, if duration of phoneme(x) is equal to one times the FR Factor and duration of phoneme (x−1) is greater than two times the FR Factor, then moving phoneme(x) earlier by one times the FR Factor frame(s);
for any phoneme, if duration of phoneme(x) is equal to one times the FR Factor and duration of phoneme (x+1) is greater than two times the FR Factor, then moving phoneme(x+1) later by one times the FR Factor frame(s);
for any phoneme, if the Mouth Open Rule equals "merge" and a SyllableStressLevel value is greater than one, and if a First Phone in Syllable is not equal to "TRUE", then changing the Mouth Open value to "inter";
for any phoneme, if Mouth Open Rule equals "merge", and if First Phone in Syllable not equal to "TRUE", then changing the Mouth Open value to "inter";
for any phoneme, if Mouth Open Rule equals "vowel" and a SyllableStressLevel value is greater than one, then designating a Mouth Wide-Narrow parameter to "inter" and designating a Mouth Corner Up-Down parameter to "inter" and designating a Mouth Open parameter to "inter";
for any phoneme, if a current Mouth Wide-Narrow value is equal to "merge", and if a First Phone in Syllable is equal to "TRUE", then copying a Mouth Wide-Narrow value from a next non-same phoneme to the current Mouth Wide-Narrow value, and changing a Mouth Wide-Narrow value of next non-same phoneme to "inter";
for any phoneme, if a current Mouth Corner Up-Down value is equal to "merge", and if a First Phone in Syllable is equal to "TRUE", then copying a Mouth Corner Up-Down value from a next non-same phoneme to the current Mouth Corner Up-Down value, and changing a Mouth Corner Up-Down value of the next non-same phoneme to "inter";
for any phoneme, if a Mouth Wide-Narrow value equals "merge", and if a First Phone in Syllable is not equal to "TRUE", then changing Mouth Wide-Narrow value to "inter";
for any phoneme, if a Mouth Corner Up-Down value quals "merge", and if a First Phone in Syllable is not equal to "TRUE", then changing a Mouth Corner Up-Down value to "inter";
for all values in a Mouth Open column, if Mouth Open(x) is equal to Mouth Open (x+1), then checking if Mouth Open(x) is equal to Mouth Open(x+2), and continuing by incrementing by one, and letting n equal a total number of times that a same Mouth Open value appears in sequence, and wherein m equal n/2, rounded down to integer, and wherein Mouth Open (x+m) is an unchanged "target value", and wherein for each Mouth Open (x) to Mouth Open (x+m−1), Mouth Open is equal to "inter", and wherein for each Mouth Open (x+m+1) to Mouth Open (x+n−1), Mouth Open is equal to "inter";
for all values in a Lip Bottom Up-Down column, if Lip Bottom Up-Down (x) is equal to v (x+1), then checking if Lip Bottom Up-Down (x) is equal to Lip Bottom Up-Down (x+2), and continuing by incrementing by one, and letting n equal to a total number of times that a same Lip Bottom Up-Down value appears in sequence, and wherein m is equal to n/2, rounded down to integer, and wherein a Lip Bottom Up-Down (x+m) is an uncharged "target value", and wherein for each Lip Bottom Up-Down (x) to Lip Bottom Up-Down (x+m−1), Lip Bottom Up-Down equal "inter", and wherein for each Lip Bottom Up-Down (x+m+1) to Lip Bottom Up-Down (x+n−1), Lip Bottom Up-Down equal to "inter";
for all values in Lip Top Up-Down column, if Lip Top Up-Down (x) equals v (x+1), then checking if Lip Top Up-Down (x) equal Lip Top Up-Down (x+2), and continuing to increment by one, and letting n equal a total number of times that a same Lip Top Up-Down value appears in sequence, and wherein m equal n/2, rounded down to integer, and wherein Lip Top Up-Down (x+m) is an unchanged "target value", and wherein for each Lip Top Up-Down (x) to Lip Top Up-Down (x+m−1), Lip Top Up-Down equal "inter", and wherein for each Lip Top Up-Down (x+m+1) Lip Top Up-Down (x+n−1), Lip Top Up-Down equals "inter";
for any phoneme, if phoneme(x) equals to "AXR" or "CH" or "D" or "DH" or "DX" or "EN" or "ER" or "L" or "JH" or "N" or "NX" or "R" or "S" or "SH" or "T" or "Z" or "ZH" and firstPhoneinSyllable equals "TRUE", and duration of phoneme(x−1) is greater than five times the FR Factor, then inserting phoneme "null" three times the FR Factor frames before phoneme(x), and setting "Tongue Raise-Lower" equal to zero, "Tongue Curl" equal to zero, and "Tongue Up-Down" equal to zero, and leaving all other column values blank;
for all remaining phoneme parameters, if value equals "inter", or a parameter has no value, setting a value with linear interpolation to two decimal place accuracy, and wherein if no interpolation is possible, then using use a minimum value for a Mouth Open parameter, and using "0" for any other parameter;

for any phoneme, if phoneme equals "T", "DX" or "D", and if First Phone in Syllable equals to "TRUE", then adding "Mouth Open" value to "Tongue Raise-Lower" value;

for any phoneme, if phoneme equals "T" and syallableStressLevel equals to zero, then deleting said phoneme;

for any phoneme, if phoneme quals "T" or "D" or "N" and lastPhoneinSyllable equals to "TRUE" and firstPhoneinSyllable is not equals to "TRUE", then deleting said phoneme;

for all phonemes, if Mouth Open value is less than a Mouth Open Minimum value, then designating Mouth Open equal to the Mouth Open Minimum value;

for all phonemes, if phoneme(x) equals phoneme(x+1), then deleting phoneme(x+1) and moving phoneme(x) later so that it is half a distance to where phoneme(x+1) was;

for all phonemes, if phoneme(x) Mouth Open Rule equals "vowel" and phoneme(x+1) Mouth Open Rule equals "vowel", and if a duration of phoneme(x) less than three, then deleting phoneme(x);

for any phoneme, if a duration of phoneme(x) is less than five times the FR Factor, then for every non-tongue parameter, if ((ABS (Parameter(x+1)−Parameter(x)))/Duration) is greater than 20/FR Factor, then Parameter (x+1) equals Parameter (x)+(20 times Duration);

for any phoneme, if phoneme(x) equals "F" or "F 2" or "V" or "V2", then restoring values from the Configuration File for Lip Bottom Up-Down, Lip Top Up-Down, Lip Top Out-In, Lip Bottom Out-In, Lips Pucker-Pressed, Lips Pucker Wide, and Lips Part Center;

for any phoneme, if a duration of phoneme(x) is less than three times the FR Factor, or a duration of phoneme (x+1) is less than three times the FR Factor and phoneme (x+1) equals "R" and phoneme(x+1) firstPhoneinSyllable is not equal to "TRUE" and phoneme (x) is not equal to "B" or "F" or "G" or "K" or "P" or "SH" or "T" or "TH", then deleting phoneme (x+1);

for any phoneme, if a duration of phoneme(x) is less than three times the FR Factor or a duration of phoneme(x+1) is less than three times the FR Factor and phoneme (x+1) equals "Y" and phoneme(x+1) firstPhoneinSyllable is not equal to "TRUE", then deleting phoneme (x+1);

for every phoneme, if phoneme(x) equals "M" or "M 2", then Lip Bottom Up-Down(x) equals Mouth Open(x) times two and Lip Top Up-Down(x) equals Mouth Open(x) times negative two and Lips Part Center(x) equals zero;

for every phoneme, if phoneme(x) equals "P" or "P 2", then Lip Bottom Up-Down(x) equals (Mouth Open(x) times two) minus thirty and Lip Top Up-Down(x) equals (Mouth Open(x) times negative two) minus thirty and Lips Part Center(x) equals zero;

for every phoneme, if phoneme(x) equals "B" or "B 2", then Lip Bottom Up-Down(x) equals (Mouth Open(x) times two) plus thirty and Lip Top Up-Down(x) equals (Mouth Open(x) times negative two) plus thirty and Lips Part Center(x) equals zero;

if phoneme (x) equals "R 2" or "ER 2" and its duration is less than FR Factor times three, then deleting phoneme (x);

for every phoneme, if phoneme(x) equals "L" or "L 2" or "EL" or "EL 2", then designating Tongue Raise-Lower (x) equal to Mouth Open(x);

for every phoneme, if Tongue In-Out(x) is less than zero and Tongue Raise-Lower(x) is less than thirty, then designating Tongue In-Out(x) as equal to zero;

for every phoneme, if Tongue In-Out(x) is less than zero and Mouth Open(x) is less than twenty seven, then designating Tongue In-Out as equal to zero;

for every phoneme, if phoneme(x) equals "D" or "DH" or "DX" or "EM" or "EN" or "F" or "G" or "M" or "S" or "T" or "TH" or "Z", then designating Mouth Wide-Narrow(x) equal to Mouth Wide-Narrow(x) minus (Lips Pucker-Pressed(x−1) times 0.5) minus (Lips Pucker Wide(x−1) times 0.5); and for every phoneme, if phoneme(x) equals "EN 2" or "F 2" or "M 2" or "S 2" or "TH 2" or Z 2", then designating Mouth Wide-Narrow(x) equal to Mouth Wide-Narrow (x) minus (Lips Pucker-Pressed(x−2) time 0.5) minus (Lips Pucker Wide(x−2) times 0.5).

9. A computer program product for converting phoneme transcription data into lip sync animation data for three-dimensional (3D) animation software, the computer program product comprising:

a non-transitory computer-readable medium having executable instructions encoded thereon, such that upon execution of the instructions by one or more processors, the one or more processors perform operations of:

modifying data contained in a phoneme transcription of a pre-recorded audio file of human speech into animation keyframe data suitable for controlling a plurality of independent animation parameters of a 3D animated character, wherein the phoneme Transcription includes phonemes and the data is modified into the keyframe data by:

associating each phoneme with a Mouth Open Rule;

associating each phoneme with a Mouth Open Minimum value;

associating each phoneme with a Mouth Open Force value;

associating each phoneme with Word-And-Syllable Data; and generating keyframe data for controlling the plurality of independent animation parameters based on the Mouth Open Rule, the Mouth Open Minimum value, the Mouth Open Force value, and the Word-And-Syllable Data.

10. The computer program product as set forth in claim 9, wherein the plurality of independent animation parameters consist of Mouth Corner Up-Down, Mouth Open-Close, Mouth Wide-Narrow, Lip Bottom Out-In, Lip Bottom Up-Down, Lip Top Out-In, Lip Top Up-Down, Lips Part Center, Lips Pucker Wide, Lips Pucker Pressed, Tongue Bend Tip, Tongue Curl, Tongue In-Out, Tongue Narrow-Wide, Tongue Raise-Lower, and Tongue Up-Down.

11. The computer program product as set forth in claim 9, wherein the data is modified such that it conforms with relationships between phonemes and mouth movements.

12. The computer program product as set forth in claim 11, wherein the data is modified by performing an operation of:

changing any AW phoneme to an AA phoneme and adding a UH phoneme halfway to a next phoneme following said AA phoneme.

13. The computer program product as set forth in claim 11, wherein the data is modified by performing operations of:
labeling any phoneme that ends before a next phoneme begins as a Rest phoneme; and
for any phoneme that is after a Rest phoneme, moving said phoneme earlier by lesser of one half a distance between said phoneme and said Rest phoneme and five times a frame rate factor (FR Factor).

14. The computer program product as set forth in claim 11, wherein the data is modified by performing operations of:
for any phoneme, if a duration of said phoneme is equal to the FR Factor and a duration of the phoneme (x−1) is greater than four times the FR Factor, then moving the phoneme earlier by two times the FR Factor frames;
for any phoneme, if duration of the phoneme is equal to two times the FR Factor, and the duration of the phoneme (x−1) is greater than three times the FR Factor, then moving the phoneme earlier by one times the FR Factor frames.

15. The computer program product as set forth in claim 11, wherein the data is modified by performing operations of:
for all phonemes, if phoneme(x) is equal to "F" or "EL" or "EN" or "ER" or "L" or "M" or "N" or "S" or "SH" or "TH" or "V" or "Z" or "ZH" or "P" or "B", then creating a new Keyframe one half a distance to a next phoneme and filling in values for the associated phoneme from a configuration file.

16. The computer program product as set forth in claim 11, wherein the data is modified by performing one or more operations of:
for each phoneme, if a Mouth Open Rule is equal to "vowel" and the phoneme is a first vowel in a syllable, then marking "First Vowel in Syllable" equals TRUE;
for any phoneme, if a Mouth Open Rule is equal to "force", then designating a Mouth Open value equal to a Mouth Open Force value;
for any phoneme, if a Mouth Open Rule equals "vowel", and if Syllable Stress Level >0, then designating a Mouth Open value equal to a Mouth Open Stress Syllable value;
for any phoneme, if the phoneme is "R" and a duration of the phoneme (x−1)<5 times FR Factor, then designating the Mouth Open value of phoneme (x) equal to "inter";
for any phoneme, if phoneme (x) is equal to "W" or "WH" and a firstPhoneinSyllable is not equal to "TRUE", then designating a Mouth Open value of phoneme (x) qual to "inter";
for any phoneme, if phoneme(x) is equal to "Rest" and a duration of the phoneme is greater than six times the FR Factor, then creating keyframe "Rest 2" three times the FR Factor frames before a next phoneme;
for any phoneme, if duration of phoneme(x) is equal to one times the FR Factor and duration of phoneme (x−1) is greater than two times the FR Factor, then moving phoneme(x) earlier by one times the FR Factor frame(s);
for any phoneme, if duration of phoneme(x) is equal to one times the FR Factor and duration of phoneme (x+1) is greater than two times the FR Factor, then moving phoneme(x+1) later by one times the FR Factor frame(s);
for any phoneme, if the Mouth Open Rule equals "merge" and a SyllableStressLevel value is greater than one, and if a First Phone in Syllable is not equal to "TRUE", then changing the Mouth Open value to "inter";
for any phoneme, if Mouth Open Rule equals "merge", and if First Phone in Syllable not equal to "TRUE", then changing the Mouth Open value to "inter";
for any phoneme, if Mouth Open Rule equals "vowel" and a SyllableStressLevel value is greater than one, then designating a Mouth Wide-Narrow parameter to "inter" and designating a Mouth Corner Up-Down parameter to "inter" and designating a Mouth Open Parameter to "inter";
for any phoneme, if a current Mouth Wide-Narrow value is equal to "merge", and if a First Phone in Syllable is equal to "TRUE", then copying a Mouth Wide-Narrow value from a next non-same phoneme to the current Mouth Wide-Narrow value, and changing a Mouth Wide-Narrow value of next non-same phoneme to "inter";
for any phoneme, if a current Mouth Corner Up-Down value is equal to "merge", and if a First Phone in Syllable is equal to "TRUE", then copying a Mouth Corner Up-Down value from a next non-same phoneme to the current Mouth Corner Up-Down value, and changing a Mouth Corner Up-Down value of the next non-same phoneme to "inter";
for any phoneme, if a Mouth Wide-Narrow value equals "merge", and if a First Phone in Syllable is not equal to "TRUE", then changing Mouth Wide-Narrow value to "inter";
for any phoneme, if a Mouth Corner Up-Down value quals "merge", and if a First Phone in Syllable is not equal to "TRUE", then changing a Mouth Corner Up-Down value to "inter";
for all values in a Mouth Open column, if Mouth Open(x) is equal to Mouth Open (x+1), then checking if Mouth Open(x) is equal to Mouth Open(x+2), and continuing by incrementing by one, and letting n equal a total number of times that a same Mouth Open value appears in sequence, and wherein m equal n/2, rounded down to integer, and wherein Mouth Open (x+m) is an unchanged "target value", and wherein for each Mouth Open (x) to Mouth Open (x+m−1), Mouth Open is equal to "inter", and wherein for each Mouth Open (x+m+1) to Mouth Open (x+n−1), Mouth Open is equal to "inter";
for all values in a Lip Bottom Up-Down column, if Lip Bottom Up-Down (x) is equal to v (x+1), then checking if Lip Bottom Up-Down (x) is equal to Lip Bottom Up-Down (x+2), and continuing by incrementing by one, and letting n equal to a total number of times that a same Lip Bottom Up-Down value appears in sequence, and wherein m is equal to n/2, rounded down to integer, and wherein a Lip Bottom Up-Down (x+m) is an uncharged "target value", and wherein for each Lip Bottom Up-Down (x) to Lip Bottom Up-Down (x+m−1), Lip Bottom Up-Down equal "inter", and wherein for each Lip Bottom Up-Down (x+m+1) to Lip Bottom Up-Down (x+n−1), Lip Bottom Up-Down equal to "inter";
for all values in Lip Top Up-Down column, if Lip Top Up-Down (x) equals v (x+1), then checking if Lip Top Up-Down (x) equal Lip Top Up-Down (x+2), and continuing to increment by one, and letting n equal a total number of times that a same Lip Top Up-Down value appears in sequence, and wherein m equal n/2, rounded down to integer, and wherein Lip Top Up-Down (x+m) is an unchanged "target value", and wherein for each Lip Top Up-Down (x) to Lip Top Up-Down (x+m−1), Lip Top Up-Down equal "inter", and wherein for each Lip Top Up-Down (x+m+1) Lip Top Up-Down (x+n−1), Lip Top Up-Down equals "inter";

for any phoneme, if phoneme(x) equals to "AXR" or "CH" or "D" or "DH" or "DX" or "EN" or "ER" or "L" or "JH" or "N" or "NX" or "R" or "S" or "SH" or "T" or "Z" or "ZH" and firstPhoneinSyllable equals "TRUE", and duration of phoneme(x−1) is greater than five times the FR Factor, then inserting phoneme "null" three times the FR Factor frames before phoneme(x), and setting "Tongue Raise-Lower" equal to zero, "Tongue Curl" equal to zero, and "Tongue Up-Down" equal to zero, and leaving all other column values blank;

for all remaining phoneme parameters, if value equals "inter", or a parameter has no value, setting a value with linear interpolation to two decimal place accuracy, and wherein if no interpolation is possible, then using use a minimum value for a Mouth Open parameter, and using "0" for any other parameter;

for any phoneme, if phoneme equals "T", "DX" or "D", and if First Phone in Syllable equals to "TRUE", then adding "Mouth Open" value to "Tongue Raise-Lower" value;

for any phoneme, if phoneme equals "T" and syallableStressLevel equals to zero, then deleting said phoneme;

for any phoneme, if phoneme quals "T" or "D" or "N" and lastPhoneinSyllable equals to "TRUE" and firstPhoneinSyllable is not equals to "TRUE", then deleting said phoneme;

for all phonemes, if Mouth Open value is less than a Mouth Open Minimum value, then designating Mouth Open equal to the Mouth Open Minimum value;

for all phonemes, if phoneme(x) equals phoneme(x+1), then deleting phoneme(x+1) and moving phoneme(x) later so that it is half a distance to where phoneme(x+1) was;

for all phonemes, if phoneme(x) Mouth Open Rule equals "vowel" and phoneme(x+1) Mouth Open Rule equals "vowel", and if a duration of phoneme(x) less than three, then deleting phoneme(x);

for any phoneme, if a duration of phoneme(x) is less than five times the FR Factor, then for every non-tongue parameter, if ((ABS (Parameter(x+1)−Parameter(x)))/Duration) is greater than 20/FR Factor, then Parameter (x+1) equals Parameter (x)+(20 times Duration);

for any phoneme, if phoneme(x) equals "F" or "F 2" or "V" or "V2", then restoring values from the Configuration File for Lip Bottom Up-Down, Lip Top Up-Down, Lip Top Out-In, Lip Bottom Out-In, Lips Pucker-Pressed, Lips Pucker Wide, and Lips Part Center;

for any phoneme, if a duration of phoneme(x) is less than three times the FR Factor, or a duration of phoneme (x+1) is less than three times the FR Factor and phoneme (x+1) equals "R" and phoneme(x+1) firstPhoneinSyllable is not equal to "TRUE" and phoneme (x) is not equal to "B" or "F" or "G" or "K" or "P" or "SH" or "T" or "TH", then deleting phoneme (x+1);

for any phoneme, if a duration of phoneme(x) is less than three times the FR Factor or a duration of phoneme(x+1) is less than three times the FR Factor and phoneme (x+1) equals "Y" and phoneme(x+1) firstPhoneinSyllable is not equal to "TRUE", then deleting phoneme (x+1);

for every phoneme, if phoneme(x) equals "M" or "M 2", then Lip Bottom Up-Down(x) equals Mouth Open(x) times two and Lip Top Up-Down(x) equals Mouth Open(x) times negative two and Lips Part Center(x) equals zero;

for every phoneme, if phoneme(x) equals "P" or "P 2", then Lip Bottom Up-Down(x) equals (Mouth Open(x) times two) minus thirty and Lip Top Up-Down(x) equals (Mouth Open(x) times negative two) minus thirty and Lips Part Center(x) equals zero;

for every phoneme, if phoneme(x) equals "B" or "B 2", then Lip Bottom Up-Down(x) equals (Mouth Open(x) times two) plus thirty and Lip Top Up-Down(x) equals (Mouth Open(x) times negative two) plus thirty and Lips Part Center(x) equals zero;

if phoneme (x) equals "R 2" or "ER 2" and its duration is less than FR Factor times three, then deleting phoneme (x);

for every phoneme, if phoneme(x) equals "L" or "L 2" or "EL" or "EL 2", then designating Tongue Raise-Lower (x) equal to Mouth Open(x);

for every phoneme, if Tongue In-Out(x) is less than zero and Tongue Raise-Lower(x) is less than thirty, then designating Tongue In-Out(x) as equal to zero;

for every phoneme, if Tongue In-Out(x) is less than zero and Mouth Open(x) is less than twenty seven, then designating Tongue In-Out as equal to zero;

for every phoneme, if phoneme(x) equals "D" or "DH" or "DX" or "EM" or "EN" or "F" or "G" or "M" or "S" or "T" or "TH" or "Z", then designating Mouth Wide-Narrow(x) equal to Mouth Wide-Narrow(x) minus (Lips Pucker-Pressed(x−1) times 0.5) minus (Lips Pucker Wide(x−1) times 0.5); and for every phoneme, if phoneme(x) equals "EN 2" or "F 2" or "M 2" or "S 2" or "TH 2" or Z 2", then designating Mouth Wide-Narrow(x) equal to Mouth Wide-Narrow (x) minus (Lips Pucker-Pressed(x−2) time 0.5) minus (Lips Pucker Wide(x−2) times 0.5).

17. A computer implemented method for converting phoneme transcription data into lip sync animation data for three-dimensional (3D) animation software, the method comprising an act of:

causing one or more processors to execute instructions encoded on a non-transitory computer-readable medium, such that upon execution, the one or more processors perform operations of:

modifying data contained in a phoneme transcription of a pre-recorded audio file of human speech into animation keyframe data suitable for controlling a plurality of independent animation parameters of a 3D animated character, wherein the phoneme Transcription includes phonemes and the data is modified into the keyframe data by:

associating each phoneme with a Mouth Open Rule;

associating each phoneme with a Mouth Open Minimum value;

associating each phoneme with a Mouth Open Force value;

associating each phoneme with Word-And-Syllable Data; and generating keyframe data for controlling the plurality of independent animation parameters based on the Mouth Open Rule, the Mouth Open Minimum value, the Mouth Open Force value, and the Word-And-Syllable Data.

18. The method as set forth in claim 17, wherein the plurality of independent animation parameters consist of Mouth Corner Up-Down, Mouth Open-Close, Mouth Wide-Narrow, Lip Bottom Out-In, Lip Bottom Up-Down, Lip Top Out-In, Lip Top Up-Down, Lips Part Center, Lips Pucker Wide, Lips Pucker Pressed, Tongue Bend Tip, Tongue Curl, Tongue In-Out, Tongue Narrow-Wide, Tongue Raise-Lower, and Tongue Up-Down.

19. The method as set forth in claim 17, wherein the data is modified such that it conforms with relationships between phonemes and mouth movements.

20. The method as set forth in claim 19, wherein the data is modified by performing an operation of:
changing any AW phoneme to an AA phoneme and adding a UH phoneme halfway to a next phoneme following said AA phoneme.

21. The method as set forth in claim 19, wherein the data is modified by performing operations of:
labeling any phoneme that ends before a next phoneme begins as a Rest phoneme; and
for any phoneme that is after a Rest phoneme, moving said phoneme earlier by lesser of one half a distance between said phoneme and said Rest phoneme and five times a frame rate factor (FR Factor).

22. The method as set forth in claim 19, wherein the data is modified by performing operations of:
for any phoneme, if a duration of said phoneme is equal to the FR Factor and a duration of the phoneme (x−1) is greater than four times the FR Factor, then moving the phoneme earlier by two times the FR Factor frames;
for any phoneme, if duration of the phoneme is equal to two times the FR Factor, and the duration of the phoneme (x−1) is greater than three times the FR Factor, then moving the phoneme earlier by one times the FR Factor frames.

23. The method as set forth in claim 19, wherein the data is modified by performing operations of:
for all phonemes, if phoneme(x) is equal to "F" or "EL" or "EN" or "ER" or "L" or "M" or "N" or "S" or "SH" or "TH" or "V" or "Z" or "ZH" or "P" or "B", then creating a new Keyframe one half a distance to a next phoneme and filling in values for the associated phoneme from a configuration file.

24. The method as set forth in claim 19, wherein the data is modified by performing one or more operations of:
for each phoneme, if a Mouth Open Rule is equal to "vowel" and the phoneme is a first vowel in a syllable, then marking "First Vowel in Syllable" equals TRUE;
for any phoneme, if a Mouth Open Rule is equal to "force", then designating a Mouth Open value equal to a Mouth Open Force value;
for any phoneme, if a Mouth Open Rule equals "vowel", and if Syllable Stress Level >0, then designating a Mouth Open value equal to a Mouth Open Stress Syllable value;
for any phoneme, if the phoneme is "R" and a duration of the phoneme (x−1)<5 times FR Factor, then designating the Mouth Open value of phoneme (x) equal to "inter";
for any phoneme, if phoneme (x) is equal to "W" or "WH" and a firstPhoneinSyllable is not equal to "TRUE", then designating a Mouth Open value of phoneme (x) qual to "inter";
for any phoneme, if phoneme(x) is equal to "Rest" and a duration of the phoneme is greater than six times the FR Factor, then creating keyframe "Rest 2" three times the FR Factor frames before a next phoneme;
for any phoneme, if duration of phoneme(x) is equal to one times the FR Factor and duration of phoneme (x−1) is greater than two times the FR Factor, then moving phoneme(x) earlier by one times the FR Factor frame(s);
for any phoneme, if duration of phoneme(x) is equal to one times the FR Factor and duration of phoneme (x+1) is greater than two times the FR Factor, then moving phoneme(x+1) later by one times the FR Factor frame(s);
for any phoneme, if the Mouth Open Rule equals "merge" and a SyllableStressLevel value is greater than one, and if a First Phone in Syllable is not equal to "TRUE", then changing the Mouth Open value to "inter";
for any phoneme, if Mouth Open Rule equals "merge", and if First Phone in Syllable not equal to "TRUE", then changing the Mouth Open value to "inter";
for any phoneme, if Mouth Open Rule equals "vowel" and a SyllableStressLevel value is greater than one, then designating a Mouth Wide-Narrow parameter to "inter" and designating a Mouth Corner Up-Down parameter to "inter" and designating a Mouth Open parameter to "inter";
for any phoneme, if a current Mouth Wide-Narrow value is equal to "merge", and if a First Phone in Syllable is equal to "TRUE", then copying a Mouth Wide-Narrow value from a next non-same phoneme to the current Mouth Wide-Narrow value, and changing a Mouth Wide-Narrow value of next non-same phoneme to "inter";
for any phoneme, if a current Mouth Corner Up-Down value is equal to "merge", and if a First Phone in Syllable is equal to "TRUE", then copying a Mouth Corner Up-Down value from a next non-same phoneme to the current Mouth Corner Up-Down value, and changing a Mouth Corner Up-Down value of the next non-same phoneme to "inter";
for any phoneme, if a Mouth Wide-Narrow value equals "merge", and if a First Phone in Syllable is not equal to "TRUE", then changing Mouth Wide-Narrow value to "inter";
for any phoneme, if a Mouth Corner Up-Down value quals "merge", and if a First Phone in Syllable is not equal to "TRUE", then changing a Mouth Corner Up-Down value to "inter";
for all values in a Mouth Open column, if Mouth Open(x) is equal to Mouth Open (x+1), then checking if Mouth Open(x) is equal to Mouth Open(x+2), and continuing by incrementing by one, and letting n equal a total number of times that a same Mouth Open value appears in sequence, and wherein m equal n/2, rounded down to integer, and wherein Mouth Open (x+m) is an unchanged "target value", and wherein for each Mouth Open (x) to Mouth Open (x+m−1), Mouth Open is equal to "inter", and wherein for each Mouth Open (x+m+1) to Mouth Open (x+n−1), Mouth Open is equal to "inter";
for all values in a Lip Bottom Up-Down column, if Lip Bottom Up-Down (x) is equal to v (x+1), then checking if Lip Bottom Up-Down (x) is equal to Lip Bottom Up-Down (x+2), and continuing by incrementing by one, and letting n equal to a total number of times that a same Lip Bottom Up-Down value appears in sequence, and wherein m is equal to n/2, rounded down to integer, and wherein a Lip Bottom Up-Down (x+m) is an uncharged "target value", and wherein for each Lip Bottom Up-Down (x) to Lip Bottom Up-Down (x+m−1), Lip Bottom Up-Down equal "inter", and wherein for each Lip Bottom Up-Down (x+m+1) to Lip Bottom Up-Down (x+n−1), Lip Bottom Up-Down equal to "inter";

for all values in Lip Top Up-Down column, if Lip Top Up-Down (x) equals v (x+1), then checking if Lip Top Up-Down (x) equal Lip Top Up-Down (x+2), and continuing to increment by one, and letting n equal a total number of times that a same Lip Top Up-Down value appears in sequence, and wherein m equal n/2, rounded down to integer, and wherein Lip Top Up-Down (x+m) is an unchanged "target value", and wherein for each Lip Top Up-Down (x) to Lip Top Up-Down (x+m−1), Lip Top Up-Down equal "inter", and wherein for each Lip Top Up-Down (x+m+1) Lip Top Up-Down (x+n−1), Lip Top Up-Down equals "inter";

for any phoneme, if phoneme(x) equals to "AXR" or "CH" or "D" or "DH" or "DX" or "EN" or "ER" or "L" or "JH" or "N" or "NX" or "R" or "S" or "SH" or "T" or "Z" or "ZH" and firstPhoneinSyllable equals "TRUE", and duration of phoneme(x−1) is greater than five times the FR Factor, then inserting phoneme "null" three times the FR Factor frames before phoneme(x), and setting "Tongue Raise-Lower" equal to zero, "Tongue Curl" equal to zero, and "Tongue Up-Down" equal to zero, and leaving all other column values blank;

for all remaining phoneme parameters, if value equals "inter", or a parameter has no value, setting a value with linear interpolation to two decimal place accuracy, and wherein if no interpolation is possible, then using use a minimum value for a Mouth Open parameter, and using "0" for any other parameter;

for any phoneme, if phoneme equals "T", "DX" or "D", and if First Phone in Syllable equals to "TRUE", then adding "Mouth Open" value to "Tongue Raise-Lower" value;

for any phoneme, if phoneme equals "T" and syallableStressLevel equals to zero, then deleting said phoneme;

for any phoneme, if phoneme quals "T" or "D" or "N" and lastPhoneinSyllable equals to "TRUE" and firstPhoneinSyllable is not equals to "TRUE", then deleting said phoneme;

for all phonemes, if Mouth Open value is less than a Mouth Open Minimum value, then designating Mouth Open equal to the Mouth Open Minimum value;

for all phonemes, if phoneme(x) equals phoneme(x+1), then deleting phoneme(x+1) and moving phoneme(x) later so that it is half a distance to where phoneme(x+1) was;

for all phonemes, if phoneme(x) Mouth Open Rule equals "vowel" and phoneme(x+1) Mouth Open Rule equals "vowel", and if a duration of phoneme(x) less than three, then deleting phoneme(x);

for any phoneme, if a duration of phoneme(x) is less than five times the FR Factor, then for every non-tongue parameter, if ((ABS (Parameter(x+1)−Parameter(x)))/Duration) is greater than 20/FR Factor, then Parameter (x+1) equals Parameter (x)+(20 times Duration);

for any phoneme, if phoneme(x) equals "F" or "F 2" or "V" or "V2", then restoring values from the Configuration File for Lip Bottom Up-Down, Lip Top Up-Down, Lip Top Out-In, Lip Bottom Out-In, Lips Pucker-Pressed, Lips Pucker Wide, and Lips Part Center;

for any phoneme, if a duration of phoneme(x) is less than three times the FR Factor, or a duration of phoneme (x+1) is less than three times the FR Factor and phoneme (x+1) equals "R" and phoneme(x+1) firstPhoneinSyllable is not equal to "TRUE" and phoneme (x) is not equal to "B" or "F" or "G" or "K" or "P" or "SH" or "T" or "TH", then deleting phoneme (x+1);

for any phoneme, if a duration of phoneme(x) is less than three times the FR Factor or a duration of phoneme(x+1) is less than three times the FR Factor and phoneme (x+1) equals "Y" and phoneme(x+1) firstPhoneinSyllable is not equal to "TRUE", then deleting phoneme (x+1);

for every phoneme, if phoneme(x) equals "M" or "M 2", then Lip Bottom Up-Down(x) equals Mouth Open(x) times two and Lip Top Up-Down(x) equals Mouth Open(x) times negative two and Lips Part Center(x) equals zero;

for every phoneme, if phoneme(x) equals "P" or "P 2", then Lip Bottom Up-Down(x) equals (Mouth Open(x) times two) minus thirty and Lip Top Up-Down(x) equals (Mouth Open(x) times negative two) minus thirty and Lips Part Center(x) equals zero;

for every phoneme, if phoneme(x) equals "B" or "B 2", then Lip Bottom Up-Down(x) equals (Mouth Open(x) times two) plus thirty and Lip Top Up-Down(x) equals (Mouth Open(x) times negative two) plus thirty and Lips Part Center(x) equals zero;

if phoneme (x) equals "R 2" or "ER 2" and its duration is less than FR Factor times three, then deleting phoneme (x);

for every phoneme, if phoneme(x) equals "L" or "L 2" or "EL" or "EL 2", then designating Tongue Raise-Lower (x) equal to Mouth Open(x);

for every phoneme, if Tongue In-Out(x) is less than zero and Tongue Raise-Lower(x) is less than thirty, then designating Tongue In-Out(x) as equal to zero;

for every phoneme, if Tongue In-Out(x) is less than zero and Mouth Open(x) is less than twenty seven, then designating Tongue In-Out as equal to zero;

for every phoneme, if phoneme(x) equals "D" or "DH" or "DX" or "EM" or "EN" or "F" or "G" or "M" or "S" or "T" or "TH" or "Z", then designating Mouth Wide-Narrow(x) equal to Mouth Wide-Narrow(x) minus (Lips Pucker-Pressed(x−1) times 0.5) minus (Lips Pucker Wide(x−1) times 0.5); and for every phoneme, if phoneme(x) equals "EN 2" or "F 2" or "M 2" or "S 2" or "TH 2" or Z 2", then designating Mouth Wide-Narrow(x) equal to Mouth Wide-Narrow (x) minus (Lips Pucker-Pressed(x−2) time 0.5) minus (Lips Pucker Wide(x−2) times 0.5).

\* \* \* \* \*